US008717987B2

(12) United States Patent
Das et al.

(10) Patent No.: US 8,717,987 B2
(45) Date of Patent: May 6, 2014

(54) FEMTOCELL BEACON INTERFERENCE MITIGATION WITH OUT-OF-BAND LINKS

(75) Inventors: Soumya Das, San Diego, CA (US);
Nishith Chaubey, San Diego, CA (US);
Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 13/008,258

(22) Filed: Jan. 18, 2011

(65) Prior Publication Data

US 2012/0182965 A1 Jul. 19, 2012

(51) Int. Cl.
*H04W 4/00* (2009.01)

(52) U.S. Cl.
USPC .................... 370/329; 455/434; 455/436

(58) Field of Classification Search
USPC .......................... 370/331; 455/435.1
See application file for complete search history.

(56) References Cited

U.S. PATENT DOCUMENTS

| 6,212,368 | B1* | 4/2001 | Ramesh et al. | 455/277.2 |
| 2005/0088997 | A1* | 4/2005 | Melpignano | 370/338 |
| 2008/0159234 | A1* | 7/2008 | Prakash et al. | 370/332 |
| 2009/0163216 | A1* | 6/2009 | Hoang et al. | 455/450 |
| 2009/0291690 | A1 | 11/2009 | Guvenc et al. | |
| 2010/0048212 | A1 | 2/2010 | Yavuz et al. | |
| 2010/0111035 | A1 | 5/2010 | Eskicioglu et al. | |
| 2011/0300863 | A1* | 12/2011 | Iwata | 455/435.1 |

FOREIGN PATENT DOCUMENTS

| JP | 2003348104 A | 12/2003 |
| WO | WO2010098104 A1 | 9/2010 |

OTHER PUBLICATIONS

Jung et al., Interference Avoidance and Resource Allocation for OFDMA Downlink of Femtocells with Distributed Power Control, IEICE Trans. Commun., vol. E93-B, No. 4, Apr. 2010.
Lee et al., Interference Management in LTE Femtocell Systems Using Fractional Frequency Reuse, Feb. 7-10, 2010 ICACT 2010.
International Search Report and Written Opinion—PCT/US2012/021359—ISA/EPO—Apr. 17, 2012.

* cited by examiner

*Primary Examiner* — Anh-Vu Ly
*Assistant Examiner* — Hashim Bhatti
(74) *Attorney, Agent, or Firm* — Jeffrey D. Jacobs

(57) ABSTRACT

Systems, methods, devices, and computer program products are described for mitigating macrocell interference during femtocell discovery in a wireless communications system. In one example, a mobile device may be camped on a macrocell. A femtocell transmits out-of-band (OOB) discovery signals to, or receives OOB band discovery signals from, the mobile device to facilitate presence detection. The femtocell may also be configured to use various techniques to transmit in-band beacon bursts (e.g., low or high power beacon bursts) to the mobile device in the macrocell frequency range to trigger the mobile device to perform an inter-frequency scan for cell reselection. The femtocell may transmit communications signals to the mobile device in a femtocell frequency range (different from the macrocell frequency range) after the mobile device has discovered and selected the femtocell.

45 Claims, 14 Drawing Sheets

US 8,717,987 B2

FEMTOCELL BEACON INTERFERENCE MITIGATION WITH OUT-OF-BAND LINKS

BACKGROUND

The following relates generally to wireless communications and more specifically to mitigating interference during femtocell discovery. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile terminals. Base stations may communicate with mobile terminals on downstream and upstream links. Each base station has a coverage range, which may be referred to as the coverage area of the cell. In cellular deployments, the macrocell is used to describe a cell serving a wide region such as rural, suburban, and urban areas. A "femtocell" is a smaller cell, typically deployed for use in a home, small business, building, or other limited region. It often is connected to a service provider's network via a broadband connection. In 3GPP terms, femtocells may be referred to as Home NodeBs (HNB) for UMTS (WCDMA, or High Speed Packet Access (HSPA)) and Home eNodeBs (HeNB) for LTE.

For mobile terminals camped on a macrocell and approaching their femtocells, it may be desirable to have them discover and reselect to their femtocell even when the femtocell is operating on another carrier. To facilitate femtocell discovery, femtocells may transmit a beacon signal on the macrocell's frequency to cause the mobile terminal to perform an inter-frequency search. This in-band beacon signal may cause interference within the macrocell, which may degrade the capacity and user perceived performance in the macrocell. It may, therefore, be beneficial for novel femtocell architectures to be developed to mitigate the interference caused by this beacon.

SUMMARY

The described features generally relate to femtocell discovery. Further scope of the applicability of the described aspects will become apparent from the following detailed description, claims, and drawings. The detailed description and specific examples are given by way of illustration only, since various changes and modifications within the spirit and scope of the description will become apparent to those skilled in the art.

Systems, methods, devices, and computer program products are described for mitigating interference during femtocell discovery in a wireless communications system. In one example, a mobile device may be camped on a macrocell. A femtocell transmits or receives out-of-band discovery signals (e.g., Bluetooth signals) to or from the mobile device to facilitate presence detection. The femtocell may also be configured to transmit in-band beacon bursts (e.g., low or high power beacon bursts) to the mobile device in the macrocell frequency range to trigger the mobile device to perform an inter-frequency scan for cell reselection. The femtocell may transmit communications signals in a femtocell frequency range to the mobile device after the mobile device has discovered and selected the femtocell, the femtocell frequency range different from the macrocell frequency range.

An example of a system for femtocell discovery may include a mobile device camped in a first frequency range on a macrocell. The system may also include a femtocell access point with a first transceiver configured to transmit to, or receive from, the mobile device an out-of-band (OOB) discovery signal in a second frequency range, the second frequency range different from the first frequency range; a second transmitter configured to perform transmissions in a third frequency range to the mobile device, the third frequency range different from the first frequency range and the second frequency range; and a third transmitter configured to perform in-band beacon burst transmissions in the first frequency range to the mobile device to trigger the mobile device to perform an inter-frequency scan for cell reselection.

Examples of such a system may include the third transmitter performing low power, in-band beacon burst transmissions in the first frequency range and/or high power, in-band beacon burst transmissions in the first frequency range. Examples of such a system may also include in-band beacon burst transmissions in the first frequency range which may comprise time-division multiplexed signals.

The femtocell access point of the system may include a controller, communicatively coupled with the first transceiver, the second transmitter, and the third transmitter, which may be configured to: monitor for discovery signals in the second frequency range to detect a mobile device presence; and suspend in-band beacon burst transmissions in the first frequency range to the mobile device when a no mobile device presence is detected. The femtocell access point of the system may include a controller, communicatively coupled with the first transceiver, the second transmitter, and the third transmitter, which may be configured to: monitor for discovery signals in the second frequency range to detect a mobile device presence; and activate in-band beacon burst transmissions in the first frequency range to the mobile device when the presence of one or more mobile devices is detected. The activated in-band beacon burst transmissions may comprise a time-division multiplexed beacon which hops from the first frequency range to other macrocell frequency ranges. The in-band beacon burst transmissions may remain suspended when the presence of one or more mobile devices already camped on the third frequency is detected.

The femtocell access point of the system may include a controller, communicatively coupled with the first transceiver and the second transmitter, which may be configured to: monitor for discovery signals in the second frequency range to detect a presence of a mobile device registered with the femtocell access point; and suspend in-band beacon burst transmissions in the first frequency range to the mobile device when no mobile devices registered with the femtocell access point are detected. The femtocell access point of the system may include a controller, communicatively coupled with the first transceiver and the second transmitter, which may be configured to: monitor for discovery signals in the second frequency range to detect a presence of a mobile device registered with the femtocell access point; and activate in-band beacon burst transmissions in the first frequency range to the mobile device when one or more mobile devices registered with the femtocell access point are detected. The activated in-band beacon burst transmissions may comprise a time-division multiplexed beacon which hops from the first frequency range to other macrocell frequency ranges.

The femtocell access point of the system may include a controller, communicatively coupled with the first transceiver and the second transmitter, which may be configured to: monitor for discovery signals in the second frequency range to detect a mobile device presence; transmit high power, in-band beacon burst transmissions in the first frequency range at a first interval when no mobile devices registered with the femtocell access point are detected; and transmit high power, in-band beacon burst transmissions in the first frequency range at a second interval, shorter than the first interval when no mobile devices registered with the femtocell access point are detected. The femtocell access point of the system may include a controller, communicatively coupled with the first transceiver and the second transmitter, which may be configured to: monitor signals in the second frequency range to detect a mobile device presence; transmit low power, in-band beacon burst transmissions in the first frequency range at a first interval when no mobile devices registered with the femtocell access point are detected; and transmit low power, in-band beacon burst transmissions in the first frequency range at a second interval, shorter than the first interval when no mobile devices registered with the femtocell access point are detected.

The system may further include the mobile device which may be configured to: detect a presence of the femtocell access point by transmitting to or receiving from the femtocell access point an OOB discovery signal in the second frequency range; identify the third frequency range in response to detecting the presence of the femtocell access point; and select the femtocell. The mobile device may be configured to detect a presence of the femtocell access point by transmitting to or receiving from the femtocell access point an OOB discovery signal in the second frequency range; perform an inter-frequency scan for cell reselection in response to detecting the presence of the femtocell access point; identify the third frequency range from the inter-frequency scan; and select the femtocell. The third transmitter which may be configured to perform low power, in-band beacon burst transmissions in the first frequency range, and the mobile device may perform the inter-frequency scan for cell reselection in response to detecting the presence of the femtocell access point without waiting for the low power, in-band beacon burst transmissions.

OOB discovery signals from the first transceiver to the mobile device may comprise a Bluetooth page sequence or Bluetooth inquiry sequence, and the OOB discovery signals to the first transceiver from the mobile device may comprise a Bluetooth page sequence or a Bluetooth inquiry sequence. The system may include a number of additional macrocell transmitters configured to perform in-band transmissions in a plurality of additional frequency ranges, wherein, the third transmitter is configured to perform in-band beacon burst transmissions in the plurality of additional frequency ranges to trigger mobile devices to perform an inter-frequency scan for cell reselection. The system may include in-band beacon burst transmissions which may comprise time-division multiplexed beacons which hop from the first frequency range to each of the plurality of additional frequency ranges in a round robin pattern. The mobile device may be camped in the first frequency range in an active or idle state.

In another set of examples, a femtocell access point configured to facilitate femtocell discovery for a mobile device camped in a first frequency range on a macrocell includes: a first transceiver configured to transmit to, or receive from, the mobile device an OOB discovery signal in a second frequency range, the second frequency range different from the first frequency range; a second transmitter configured to perform transmissions in a third frequency range to the mobile device, the third frequency range different from the first frequency range and the second frequency range; and a third transmitter configured to perform in-band beacon burst transmissions in the first frequency range to the mobile device to trigger the mobile device to perform an inter-frequency scan for cell reselection.

The third transmitter may be configured to perform low power, in-band beacon burst transmissions in the first frequency range and/or perform high power, in-band beacon burst transmissions in the first frequency range. The exemplary femtocell access point may be configured so that in-band beacon burst transmissions in the first frequency range comprise time-division multiplexed signals.

The femtocell access point may further comprise a controller, communicatively coupled with the first transceiver, the second transmitter, and the third transmitter, which may be configured to: monitor for discovery signals in the second frequency range to detect a mobile device presence; and suspend in-band beacon burst transmissions in the first frequency range to the mobile device when no mobile device presence is detected. The exemplary femtocell access point may further comprise a controller, communicatively coupled with the first transceiver, the second transmitter, and the third transmitter, which may be configured to: monitor for discovery signals in the second frequency range to detect a mobile device presence; and activate in-band beacon burst transmissions in the first frequency range to the mobile device when the presence of one or more mobile devices is detected. The activated in-band beacon burst transmissions may comprise a time-division multiplexed beacon which hops from the first frequency range to other macrocell frequency ranges. The in-band beacon burst transmissions may remain suspended when the presence of one or more mobile devices already camped on the third frequency is detected.

The femtocell access point may further comprise a controller, communicatively coupled with the first transceiver and the second transmitter, which may be configured to: monitor for discovery signals in the second frequency range to detect a presence of a mobile device registered with the femtocell access point; and suspend in-band beacon burst transmissions in the first frequency range to the mobile device when no mobile devices registered with the femtocell access point are detected. The femtocell access point may further comprise a controller, communicatively coupled with the first transceiver and the second transmitter, which may be configured to: monitor for discovery signals in the second frequency range to detect a presence of a mobile device registered with the femtocell access point; and activate in-band beacon burst transmissions in the first frequency range to the mobile device when one or more mobile devices registered with the femtocell access point are detected. The activated in-band beacon burst transmissions may comprise a time-division multiplexed beacon which hops from the first frequency range to other macrocell frequency ranges.

The femtocell access point may further comprise a controller, communicatively coupled with the first transceiver and the second transmitter, which may be configured to: monitor for discovery signals in the second frequency range to detect a mobile device presence; transmit high power, in-band beacon burst transmissions in the first frequency range at a first interval when no mobile devices registered with the femtocell access point are detected; and transmit high power, in-band beacon burst transmissions in the first frequency range at a second interval, shorter than the first interval when no mobile devices registered with the femtocell access point are detected.

The femtocell access point may further comprise a controller, communicatively coupled with the first transceiver and the second transmitter, which may be configured to: monitor signals in the second frequency range to detect a mobile device presence; transmit low power, in-band beacon burst transmissions in the first frequency range at a first interval when no mobile devices registered with the femtocell access point are detected; and transmit low power, in-band beacon burst transmissions in the first frequency range at a second interval, shorter than the first interval when no mobile devices registered with the femtocell access point are detected.

OOB discovery signals transmitted from the first transceiver to the mobile device may comprise a Bluetooth page sequence or a Bluetooth inquiry sequence. OOB discovery signals transmitted to the first transceiver from the mobile device may comprise a Bluetooth page sequence or a Bluetooth inquiry sequence. The femtocell access point may further include: a plurality of additional macrocell transmitters configured to perform in-band transmissions in a plurality of additional frequency ranges, wherein, the third transmitter is configured to perform in-band beacon burst transmissions in the plurality of additional frequencies to trigger mobile devices to perform an inter-frequency scan for cell reselection. These in-band beacon burst transmissions may comprise time-division multiplexed beacons which hop from the first frequency range to each of the plurality of additional frequency ranges in a round robin pattern. The femtocell access point may also include a mobile device camped in the first frequency range in an active or idle state.

In another set of examples, a mobile device camped in a first frequency range on a macrocell may be configured to: detect a presence of a femtocell access point by transmitting to or receiving from a first transceiver at the femtocell access point an OOB discovery signal in a second frequency range, the second frequency range different from the first frequency range; identify a third frequency range in response to detecting the presence of the femtocell access point, the third frequency range for communications with a second transceiver at the femtocell access point, the third frequency range different from the first frequency range and the second frequency range; and select the femtocell, wherein the femtocell access point further includes a third transmitter configured to perform in-band beacon burst transmissions in the first frequency range.

The mobile device may be configured to: detect a presence of a femtocell access point by transmitting to or receiving from a first transceiver at the femtocell access point an OOB discovery signal in a second frequency range, the second frequency range different from the first frequency range; perform an inter-frequency scan for cell reselection in response to detecting the presence of the femtocell access point; identify a third frequency range from the inter-frequency scan, the third frequency range for communications with a second transceiver at the femtocell access point, the third frequency range different from the first frequency range and the second frequency range; select the femtocell, wherein the femtocell access point further includes a third transmitter configured to perform in-band beacon burst transmissions in the first frequency range; and perform the inter-frequency scan for cell reselection in response to detecting the presence of the femtocell access point without waiting for low power, in-band beacon burst transmissions.

In still another set of examples, a computer program product for facilitating femtocell discovery for a mobile device camped in a first frequency range on a macrocell may include a computer-readable medium which may include: code for causing a first transceiver to transmit to, or receive from, a mobile device an OOB discovery signal in a second frequency range, the second frequency range different from the first frequency range; code for causing a second transmitter configured to perform transmissions in a third frequency range to the mobile device, the third frequency range different from the first frequency range and the second frequency range; and code for causing a third transmitter configured to perform in-band beacon burst transmissions in the first frequency range to the mobile device to trigger the mobile device to perform an inter-frequency scan for cell reselection.

In another set of examples, an apparatus for facilitating femtocell discovery by a mobile device camped in a first frequency range on a macrocell may include: means for transmitting to, or receiving from, a mobile device an OOB discovery signal in a second frequency range, the second frequency range different from the first frequency range; means for transmitting communication signals in a third frequency range to the mobile device, the third frequency range different from the first frequency range and the second frequency range; and means for transmitting in-band beacon burst transmissions in the first frequency range to the mobile device to trigger the mobile device to perform an inter-frequency scan for cell reselection.

In another set of examples, a method for facilitating femtocell discovery by a mobile device camped in a first frequency range on a macrocell may include: transmitting to, or receiving from, a mobile device an OOB discovery signal in a second frequency range, the second frequency range different from the first frequency range; transmitting communication signals in a third frequency range to the mobile device, the third frequency range different from the first frequency range and the second frequency range; and transmitting in-band beacon bursts in the first frequency range to the mobile device to trigger the mobile device to perform an inter-frequency scan for cell reselection.

The in-band beacon bursts may include low power, in-band beacon bursts in the first frequency range and/or high power, in-band beacon bursts in the first frequency range. The in-band beacon burst transmissions in the first frequency range may comprise time-division multiplexed signals.

The method may also comprise monitoring for discovery signals in the second frequency range to detect a mobile device presence; suspending in-band beacon burst transmissions in the first frequency range to the mobile device when no mobile device presence is detected; monitoring for discovery signals in the second frequency range to detect a mobile device presence; and activating in-band beacon burst transmissions in the first frequency range to the mobile device when the presence of one or more mobile devices is detected. Activated in-band beacon burst transmissions may comprise a time-division multiplexed beacon which hops from the first frequency range to other macrocell frequency ranges. The in-band beacon burst transmissions may remain suspended when the presence of one or more mobile devices already camped on the third frequency is detected.

The method may also include monitoring for discovery signals in the second frequency range to detect a presence of a mobile device registered with the femtocell access point; and suspending in-band beacon burst transmissions in the first frequency range to the mobile device when no mobile devices registered with the femtocell are detected. Also or alternatively, the exemplary method may include monitoring for discovery signals in the second frequency range to detect a presence of a mobile device registered with the femtocell access point; and activating in-band beacon burst transmissions in the first frequency range to the mobile device when one or more mobile devices registered with the femtocell are detected. The activated in-band beacon burst transmissions may comprise a time-division multiplexed beacon which hops from the first frequency range to other macrocell frequency ranges.

The method may also or alternatively include monitoring for discovery signals in the second frequency range to detect a mobile device presence; transmitting high power, in-band beacon burst transmissions in the first frequency range at a first interval when no mobile devices registered with the femtocell access point are detected; and transmit high power, in-band beacon burst transmissions in the first frequency range at a second interval, shorter than the first interval, when no mobile devices registered with the femtocell access point are detected. The method may also or alternatively include monitoring signals in the second frequency range to detect a mobile device presence; transmitting low power, in-band beacon burst transmissions in the first frequency range at a first interval when no mobile devices registered with the femtocell access point are detected; and transmitting low power, in-band beacon burst transmissions in the first frequency range at a second interval, shorter than the first interval, when no mobile devices registered with the femtocell access point are detected.

The OOB discovery signals transmitted to the mobile device may comprise a Bluetooth page sequence or a Bluetooth inquiry sequence. OOB discovery signals received from the mobile device may comprise a Bluetooth page sequence or a Bluetooth inquiry sequence. The exemplary method may also include a plurality of additional macrocell transmitters configured to perform in-band transmissions in a plurality of additional frequency ranges, wherein in-band beacon burst transmissions are performed in the plurality of additional frequency ranges to trigger mobile devices to perform an inter-frequency scan for cell reselection. In-band beacon burst transmissions may comprise time-division multiplexed beacons which hop from the first frequency range to each of the plurality of additional frequency ranges in a round robin pattern. The OOB discovery signal in the second frequency range may comprise receiving data via a wired communication link indicating presence of the mobile device. The data received via the wired communication link indicating presence of the mobile device may comprise data transmitted from the mobile device via the first frequency range.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Systems, methods, devices, and computer program products are described for mitigating macrocell interference during femtocell discovery in a wireless communications system. In one example, a mobile device may be camped on a macrocell (e.g., in idle or active mode). A femtocell transmits out-of-band (OOB) discovery signals to, or receives OOB band discovery signals from, a mobile device to facilitate presence detection. The femtocell may also be configured to transmit in-band beacon bursts (e.g., low or high power beacon bursts) to the mobile device in the macrocell frequency range to trigger the mobile device to perform an inter-frequency scan for cell reselection. The femtocell may transmit communications signals to the mobile device in a femtocell frequency range (different from the macrocell frequency range) after the mobile device has discovered and selected the femtocell.

Techniques described herein may be used for various wireless communications systems such as CDMA, TDMA, FDMA, and OFDMA. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
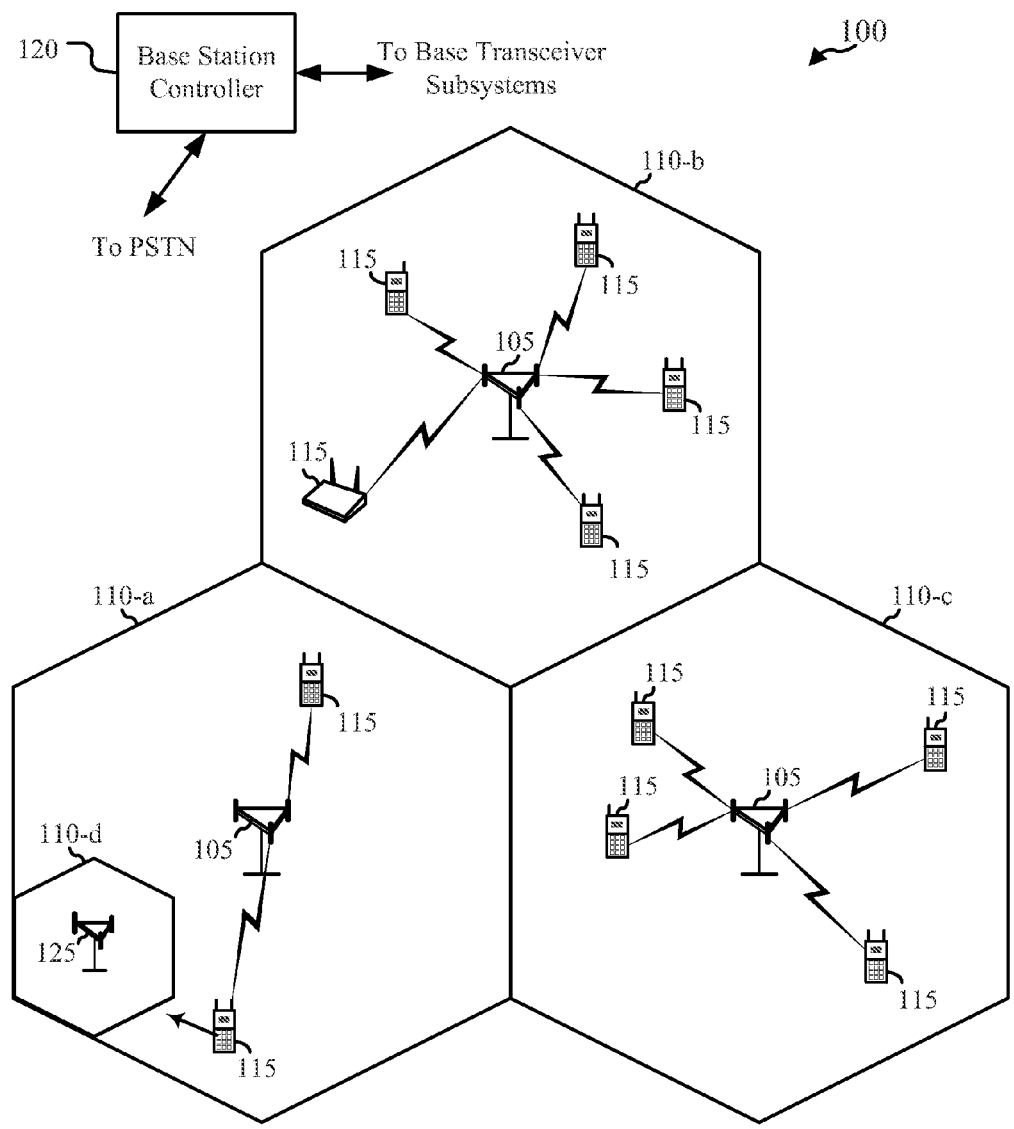
FIG. 1 is a block diagram illustrating a wireless communications system.

Referring first to FIG. 1, a block diagram illustrates an example of a wireless communications system 100. The system 100 includes base transceiver stations (BTSs) 105, disposed in cells 110, mobile devices 115, a base station controller (BSC) 120, and a femtocell access point (FAP) 125. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry control information (e.g., pilot signals), overhead information, data, etc. The system 100 may be a multi-carrier LTE system, wherein the BTS 105 represents an eNodeB. The system 100 may be a multi-carrier LTE system, wherein the BTS 105 represents a NodeB and the BSC 120 represents a radio network controller (RNC). The system 100 may be a CDMA 1X system or WiMax system, as well.

The BTSs 105 may wirelessly communicate with the mobile devices 115 via a base station antenna. The BTSs 105 are configured to communicate with the mobile devices 115 under the control of the BSC 120 via one or more carriers (the carriers collectively may occupy or correspond to a frequency range). Each of the BTSs 105 can provide communication coverage for a respective geographic area, here the cell 110-*a*, 110-*b*, or 110-*c*. The system 100 may include BTSs 105 of different types (e.g., macro, micro, and/or pico base stations), although for purposes of discussion the term macrocell will be used to refer to each and all of these different cell types.

The mobile devices 115 may be dispersed throughout the cells 110. The mobile devices 115 may be cellular phones, other wireless communications devices, personal digital assistants (PDAs), other handheld devices, netbooks, notebook computers, laptops, etc. Mobile devices 115 may include mobile stations, user equipment (UEs), access terminals (ATs), or subscriber units.

For the discussion, it may be assumed that the mobile devices 115 are initially operating on (e.g., are "camped" on) a macrocell network facilitated by multiple BTSs 105 (again, macro BTSs 105 and a macrocell network will be used to illustrate principles applicable to micro or pico cells). Each macro BTS 105 may cover a relatively large geographic area (e.g., several kilometers in radius) and may allow unrestricted access by terminals with service subscription. A portion of the mobile devices 115 may also be registered to operate in femtocell coverage area 110-*d* (e.g., communicating with FAP 125), within the coverage area of a macrocell 110-*a*. As a mobile device 115 approaches a femtocell, there may be need for novel mechanisms for the mobile device 115 to recognize the presence of the FAP 125 so that the mobile device 115 may migrate to the FAP 125 from the macro BTS 105.

Strategic deployment femtocells may be used to mitigate mobile device power consumption, as mobile devices 115 typically operate using an internal power supply, such as a small battery, to facilitate highly mobile operation. Femtocells may also be utilized to provide service within areas which might not otherwise experience adequate or even any service (e.g., due to capacity limitations, bandwidth limitations, signal fading, signal shadowing, etc.), thereby allowing mobile devices 115 to reduce searching times, to reduce transmit power, to reduce transmit times, etc. A FAP 125 may provide service within a relatively small service area (e.g., within a house or building). Accordingly, a mobile device 115 is typically disposed near a femtocell 110-*d* when being served, often allowing the mobile device 115 to communicate with reduced transmission power.

By way of example, the femtocell may be implemented as a Home NodeB ("HNB") or Home eNodeB (HeNB), and located in a user premises, such as a residence, an office building, etc. Femtocell access point (FAP) 125 will be used hereinafter generically to describe any femtocell access point, and should not be interpreted as limiting. The FAP 125 location may be chosen for maximum coverage (e.g., in a centralized location), to allow access to a global positioning satellite (GPS) signal (e.g., near a window), or in other locations. The disclosure herein assumes that a set of mobile devices 115 is registered on (e.g., on a whitelist of) a single FAP 125 that provides coverage over substantially an entire user premises. The "home" FAP 125 provides the mobile devices 115 with access to communication services via a connection to the macro communications network. As used herein, the macro communications network is assumed to be a wireless wide-area network (WWAN). As such, terms like "macrocell network" and "WWAN network" are interchangeable. Similar techniques may be applied to other types of network environments, FAP coverage topologies, etc., without departing from the scope of the disclosure or claims.

Systems, methods, devices, and computer program products are described for mitigating macrocell interference during femtocell discovery in a wireless communications system. In example configurations, the FAP 125 may be integrated with one or more OOB signaling transceivers. The FAP 125 may transmit or receive OOB discovery signals (e.g., Bluetooth page or inquiry signals) to or from a mobile device 115 to facilitate presence detection. The FAP 125 may also be configured to transmit in-band beacon bursts (e.g., low or high power beacon bursts) to the mobile device 115 in the macrocell frequency range to trigger the mobile device 115 to perform an inter-frequency scan for cell reselection (the inter-frequency scan may be triggered by having the beacon reduce the CPICH Echo of the macrocell to be lower than Qqualmin+Sintersearch). However, use of such beacons may cause interference. Limiting the use of these beacons will be discussed more detail below. The FAP 125 may transmit communications signals in a femtocell frequency range (different from the macrocell frequency range) to the mobile device 115 after the mobile device 115 has discovered and selected the femtocell.

As used herein, the term "frequency range" may be used to refer to the frequency spectrum allocated to a particular macrocell or femtocell, or for OOB signaling. A femtocell frequency range may be a first frequency channel within a set of frequencies allocated to WWAN communications, and a macrocell frequency range may be a second frequency channel within the set of frequencies allocated to WWAN communications. Additional macrocell frequency ranges may occupy other frequency channels within the set of frequencies allocated to WWAN communications. The in-band beacon bursts may be time-division multiplexed to hop among the different macrocell frequency ranges.

The terms "low power in-band beacon burst" and "high power in-band beacon burst" are used throughout this description. In one example, a "low power in-band beacon burst" may be defined as a beacon transmitted with a lower power than the "high power in-band beacon burst" in a system with two or more beacon power levels. In another example, a "low power in-band beacon burst" may be defined as a beacon which causes inter-frequency searches only when the mobile device 115 is in very close vicinity to the FAP (e.g., with 45 dB), while the "high power in-band beacon burst" is set to cause an inter-frequency search anywhere within the FAP 125 coverage area.

As used herein, "out-of-band," or "OOB," includes any type of communications that are out of band with respect to the macro communications network (or a micro or pico cell, as applicable). For example, the OOB proxies and/or the mobile device 115 may be configured to operate using Bluetooth (e.g., class 1, class 1.5, and/or class 2), ZigBee (e.g., according to the IEEE 802.15.4-2003 wireless standard), near field communication (NFC), and/or any other useful type of communications out of the macro network band.

OOB integration with the FAP 125 may provide a number of features. For example, the OOB proxies may allow for reduced interference, lower power FAP registration, and so on. Further, the integration of OOB functionality with the FAP 125 may allow the mobile devices 115 associated with the FAP 125 to also be part of an OOB piconet. The piconet may facilitate enhanced HNB functionality, other communications services, power management functionality, and/or other features to the mobile devices 115. These and other features will be further appreciated from the description below.

Figure 2:
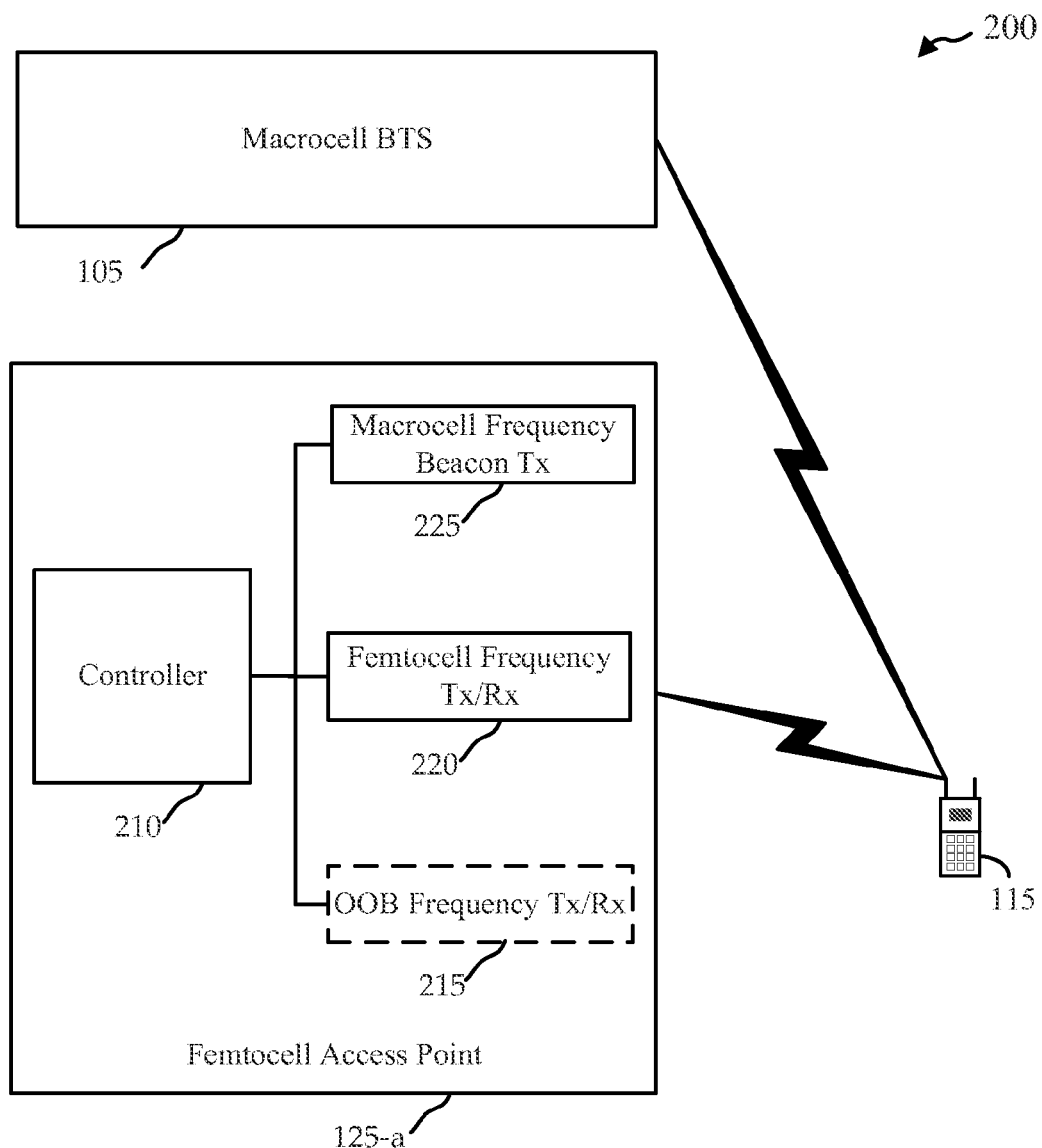
FIG. 2 is a block diagram illustrating a femtocell access point within a wireless communications system.

FIG. 2 is a block diagram of a wireless communications system 200. The system may be an example of the system 100 of FIG. 1. The system 200 includes a mobile device 115, a femtocell access point (FAP) 125-a, and a macrocell BTS 105. The FAP 125-a may include a controller 210, an OOB frequency transceiver 215, femtocell frequency transceiver 220, and macrocell frequency beacon transmitter 225. It is worth noting, however, that the OOB frequency transceiver 125-a need not always be located in the FAP 125-a, and need not even be included in some examples (as denoted by the dashed line). The OOB frequency transceiver 125-a may be located, in whole or in part, in one or more devices outside the FAP 125-a, and can communicate with the FAP 125-a over a link or via inter-process communication. Each of these components/devices may be in communication with each other, directly or indirectly.

Assume that the mobile device 115 is camped on a macrocell, and thus may be communicating with or listening for the macrocell BTS 105 over the macrocell frequency range. If the mobile device 115 approaches a femtocell, it may be desirable to have it discover and reselect to the femtocell even when the femtocell is operating on another carrier. The OOB frequency transceiver 215 may be configured to transmit OOB discovery signals (e.g., Bluetooth paging or inquiry messages) to the mobile device 115. The OOB frequency transceiver 215 may be configured to receive OOB discovery signals (e.g., Bluetooth paging or inquiry messages) from the mobile device 115. Thus, the OOB frequency transceiver 215 may be configured to notify the mobile device 115 that the FAP 125-a is in close proximity, or receive notification from a mobile device 115 that is in close proximity.

The macrocell frequency beacon transmitter 225 may perform in-band beacon burst transmissions in the macrocell frequency range to the mobile device 115 to trigger the mobile device 115 to perform an inter-frequency scan for cell reselection. These in-band beacon burst transmissions may be low power bursts, high power bursts, or a combination thereof. In some examples, they are time-division multiplexed signals (e.g., they may be low power, high power, or a low and high power combination of beacon signals transmitted in round robin fashion in a number of different macrocell frequency ranges). These beacon bursts may have varying duty cycles (e.g., depending on whether mobile device presence has been detected via a OOB discovery signal from a mobile device 115).

The controller 210 may monitor the OOB frequency transceiver 215 for discovery signals to detect a mobile device presence (the discovery signals may be transmitted to, or received from, the mobile device 115). The controller 210 may control the in-band beacon bursts based on this monitoring. In one set of examples, for open access, in-band beacon burst transmissions to the mobile device 115 may be suspended when no mobile device presence is detected (e.g., the RF circuitry of the macrocell frequency beacon transmitter 225 may be deactivated or otherwise suspended, while other components of the macrocell frequency beacon transmitter 225 remain powered on). In one example, only the high power beacon bursts are suspended, although in other examples both high and low power beacon bursts may be suspended. Suspended in-band beacon burst transmissions to the mobile device 115 may be activated or reactivated when mobile device presence is detected. As noted, in-band beacon burst transmissions may be time-division multiplexed signals transmitted in round robin fashion in a number of different macrocell frequency ranges.

In one set of examples, for restricted access femtocells, in-band beacon burst transmissions to the mobile device 115 may be suspended when no registered mobile device presence is detected (e.g., the controller 210 may compare the BD ADDR to BD ADDRs in an authorized client list to determine whether a mobile device 115 is registered). In one example, only the high power beacon bursts are suspended, although in other examples both high and low power beacon bursts may be suspended. Suspended in-band beacon burst transmissions to the mobile device 115 may be activated or reactivated when registered mobile device presence is detected.

In another set of examples, the controller 210 may control the interval of in-band beacon bursts (either low power, high power, or both) based on this monitoring. For example, the controller 210 may control the macrocell frequency beacon transmitter 225 to transmit high power, in-band beacon burst transmissions at a longer interval when no mobile devices are detected. Once a mobile device is detected, the controller 210 may control the macrocell frequency beacon transmitter 225 to transmit high power, in-band beacon burst transmissions at a shorter interval. In another example, the controller 210 may control the macrocell frequency beacon transmitter 225 to transmit low power, in-band beacon burst transmissions at a longer interval when no mobile devices are detected. Once a mobile device is detected, the controller 210 may control macrocell frequency beacon transmitter 225 to transmit low power, in-band beacon burst transmissions at a shorter interval.

In yet another set of examples, a mobile device 115 may be configured with additional functionality for the novel FAP 125-a architecture. The mobile device 115 may detect the presence of the FAP 125-a by transmitting or receiving OOB discovery signals. The mobile device 115 may, in one example, identify the femtocell frequency range in response to detecting the presence of the FAP 125-a, and select the FAP 125-a. In another example, the mobile device 115 may perform an inter-frequency scan for cell reselection in response to detecting the presence of the FAP 125-a. The mobile device 115 may identify the femtocell frequency range from the inter-frequency scan, and select the femtocell. In still other examples, the mobile device 115 or FAP 125-a may detect the other's presence through means other than OOB wireless signals (i.e., the OOB frequency transceiver 215 is not implemented, or is optional). For example, communication links over wireless macrocell frequencies and the backend of the macrocell network may be used (for example, IP-based mechanisms (e.g., IP tunnel) over a wireless wide area network (WWAN) link). Various position calculation technologies (e.g., global positioning system (GPS)), may be used by a mobile device 115, FAP 125-a, or other devices in the network to detect or otherwise indicate proximity. Thus, transmissions of the mobile device 115 via the macrocell frequency, and received via a wired link by the FAP 125-a (e.g., by way of one or more intermediate networks), may be used for proximity detection.

After the mobile device 115 selects the FAP 125 according to any of the above examples, the mobile device 115 may receive communications signals in the femtocell frequency range from the femtocell frequency transceiver 220.

Figure 3:
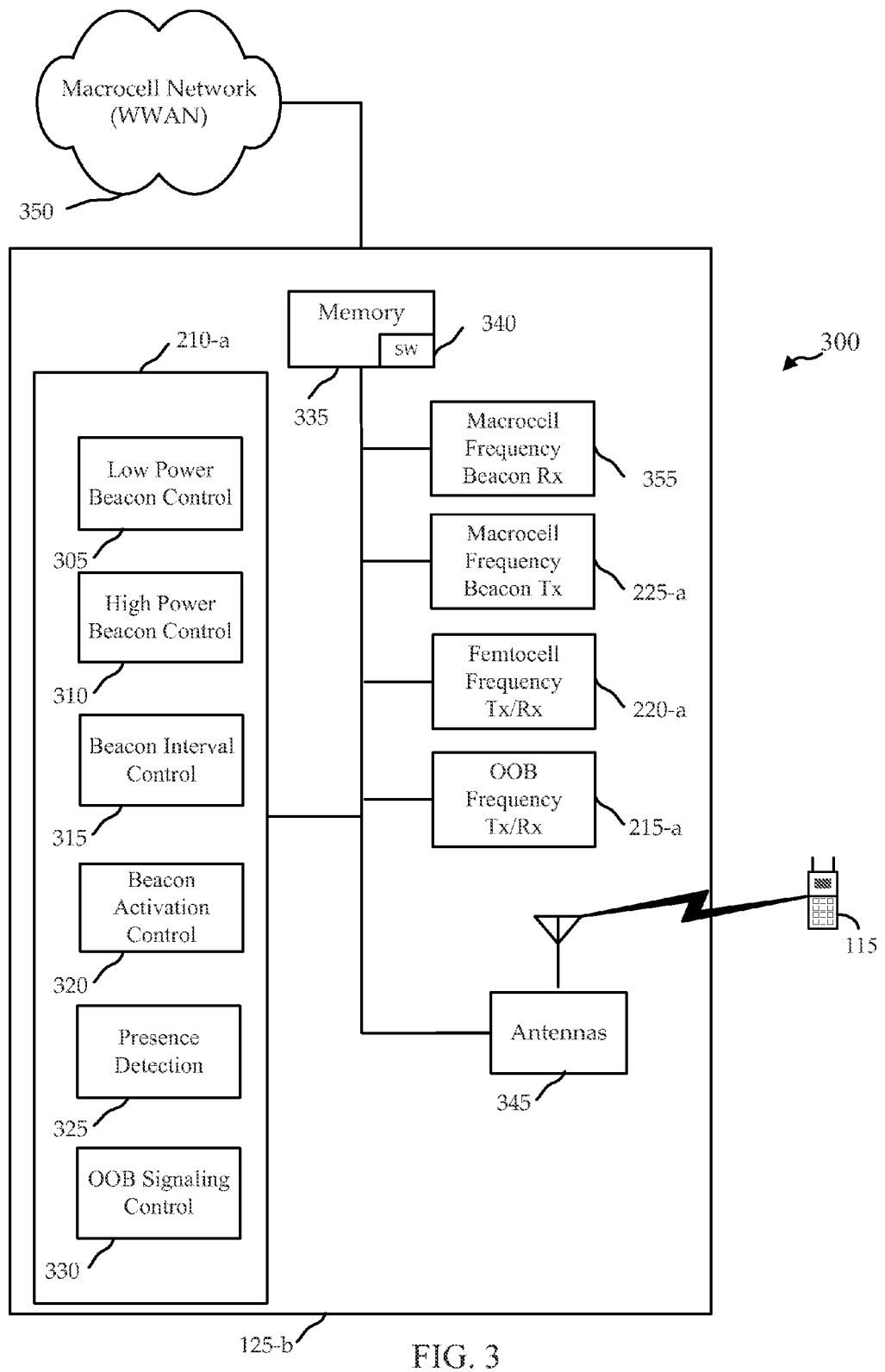
FIG. 3 is a block diagram illustrating an alternative architecture for a femtocell access point.

FIG. 3 is a block diagram 300 of a femtocell access point (FAP) 125-b. This FAP 125-b may an example of the FAP 125 of FIG. 1 or 2. The FAP 125-b may be in communication with a mobile device 115 via one or more antennas 345. The FAP 125-b includes a controller 210-a, memory 335, an OOB frequency transceiver 215-a, a femtocell frequency transceiver 220-a, a macrocell frequency beacon transmitter 225-a, and a macrocell frequency beacon receiver 355. The controller 210-a includes low power beacon control 305, high power beacon control 310, beacon interval control 315, beacon activation control 320, presence detection 325, and OOB signaling control 330 modules. Each of these components in the FAP 125-b may be in communication with each other, directly or indirectly.

The components of the FAP 125-b may be integrated into a single device, or be made up of a number of networked devices (i.e., a number of different devices in communication with each other, directly or indirectly, providing the functionality of the FAP 125-b). The components of the FAP 125-b may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The OOB frequency transceiver 215-a, femtocell frequency transceiver 220-a, macrocell frequency beacon transmitter 225-a, and macrocell frequency beacon receiver 355 may be configured to communicate bi-directionally (or uni-directionally in either direction), via the antennas 345, with the mobile device 115.

In one example, the mobile device 115 is camped on a macrocell, and thus may be communicating with or listening for the macrocell BTS over the macrocell frequency range. If the mobile device 115 approaches the FAP 125-b, it may be desirable to have it discover and reselect to the femtocell even when the femtocell is operating on another carrier. The OOB frequency transceiver 215-a may be configured to transmit OOB discovery signals (e.g., Bluetooth paging or inquiry messages) to the mobile device 115. The OOB frequency transceiver 215-a may be configured to receive OOB discovery signals (e.g., Bluetooth paging or inquiry messages) from the mobile device 115. The OOB signaling control 330 module may control the interval, frequencies, messages, etc. used by the OOB frequency transceiver 215-a in the transmission or reception of OOB signals. The presence detection 325 module may monitor the OOB signaling from or to the OOB frequency transceiver 215-a, and detect the presence of a mobile device 115 based on this monitoring. In another example, the presence detection 325 module may detect the other's presence through means other than OOB wireless signals (i.e., the OOB frequency transceiver 215 may not implemented in some examples, or is optional). As noted above, communication links over wireless macrocell frequencies and the backend of the macrocell network may be used (for example, IP-based mechanisms (e.g., IP tunnel) over a wireless wide area network (WWAN) link). Therefore, an OOB discovery signal may be a signal received at the FAP 125-b via a wired communication link indicating presence of the mobile device.

The macrocell frequency beacon transmitter 225-a may perform in-band beacon burst transmissions in the macrocell frequency. These in-band bursts may be generated to trigger the mobile device 115 to perform an inter-frequency scan for cell reselection. This may be accomplished by bringing down the CPICH Echo of the macrocell for a very short duration (e.g, a burst of a few milliseconds). These in-band beacon burst transmissions may be low power bursts, high power bursts, or a combination thereof. In some examples, they are time-division multiplexed signals (e.g., they may be low power, high power, or a low and high power combination of beacon signals transmitted in round robin fashion in a number of different macrocell frequency ranges). These beacon bursts may have varying duty cycles (e.g., depending on whether mobile device presence has been detected by the presence detection 325 module). The low power beacon control 305 module may control the power, frequency ranges, hopping sequence, etc. of low power beacon bursts from the macrocell frequency beacon transmitter 225-a. The high power beacon control 310 module may control the power, frequency ranges, hopping sequence, etc of high power beacon bursts from the macrocell frequency beacon transmitter 225-a. The low power beacon control module 305 and high power beacon control module 310 may coordinate with each other, as in some embodiments there may be only one macrocell frequency beacon transmitter 225-a, and a number of different frequency ranges on which the beacon is to be transmitted. The macrocell frequency beacon receiver 355 may listen for signals on macrocell frequencies (e.g., this may be an entity called Network Listen (NL)).

As noted, the presence detection 325 module may monitor the OOB frequency transceiver 215-a for discovery signals to detect a mobile device presence (the discovery signals may be transmitted to, or received from, the mobile device 115). The controller 210-a may control the in-band beacon bursts based on this monitoring. In one set of examples, the beacon activation control 320 module may control the macrocell frequency beacon transmitter 225-a to suspend in-band beacon burst transmissions when no mobile device presence is detected (or, for example, when no registered mobile device is detected for restricted access femtocells). The high power, low power, or both types of beacon bursts may suspended. The beacon activation control 320 module may control the macrocell frequency beacon transmitter 225-a to activate in-band beacon burst transmissions when a mobile device presence is detected (or, for example, when a registered mobile device is detected for restricted access femtocells). In one example, if a mobile device 115 already camped on the femtocell is detected, the in-band beacon burst transmissions may remain suspended. As noted, in-band beacon burst transmissions may be time-division multiplexed signals transmitted in round robin fashion in a number of different macrocell frequency ranges.

In another set of examples, the beacon interval control 315 module may control the macrocell frequency beacon transmitter 225-*a* to modify the interval of in-band beacon bursts (either low power, high power, or both) based on the monitoring. For example, the beacon interval control 315 module may control the macrocell frequency beacon transmitter 225-*a* to transmit in-band beacon burst transmissions at longer intervals when no mobile devices are detected. Once a mobile device is detected, the beacon interval control 315 module may control the macrocell frequency beacon transmitter 225 to transmit in-band beacon burst transmissions at shorter intervals. As noted, in-band beacon burst transmissions may be time-division multiplexed signals transmitted in round robin fashion in a number of different macrocell frequency ranges.

After the mobile device 115 selects the FAP 125-*b* according to any of the above examples, the mobile device 115 may receive communications signals in the femtocell frequency range from the femtocell frequency transceiver 220-*a*.

The memory 335 of the FAP 125-*b* may include random access memory (RAM) and read-only memory (ROM). The memory 335 may store computer-readable, computer-executable software code 340 containing instructions that are configured to, when executed, cause the controller 210-*a* to perform various functions described herein. Alternatively, the software 340 may not be directly executable by the controller 210-*a* but be configured to cause the computer, e.g., when compiled and executed, to perform functions described herein.

The FAP 125-*b* may be in communication with a WWAN network over a wired connection 350. The FAP 125-*b* may be in communication over other interfaces not explicitly shown in FIG. 2. For example, the FAP 125-*b* may be in communication with a native cellular interface as part of the transceiver module 210 (e.g., a specialized transceiver utilizing cellular network communication techniques that may consume relatively large amounts of power in operation) for communicating with various appropriately configured devices, such as the mobile device 115, through a native cellular wireless link (e.g., an "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the FAP 125-*b* may be in communication with one or more backend network interfaces (e.g., a backhaul interface providing communication via the Internet, a packet switched network, a switched network, a radio network, a control network, a wired link, and/or the like) for communicating with various devices or other networks.

The OOB frequency transceiver 215-*a* may consume relatively low amounts of power in operation and/or may cause less interference in the in-band spectrum with respect to the in-band transceivers. Such an OOB interface may be utilized according to embodiments to provide low power wireless communications with respect to various appropriately configured devices, such as an OOB radio of the mobile device 115. The OOB interface may, for example, be a Bluetooth-compliant transceiver that uses a time-division duplex (TDD) scheme. The OOB link may be an ultra-wideband (UWB) link, an IEEE 802.11 link, ZigBee link, an IP tunnel, a near field communication (NFC) link, a link over other unlicensed spectrum, a wired link, etc. In some examples, an OOB link need not be directly related to a mobile device 115 (e.g. deactivation of alarm system, or opening of the apartment or garage door, may indicate presence over a wired and/or wireless link) Moreover, virtual OOB links may be used, such as through use of IP-based mechanisms over a wireless wide area network (WWAN) link (e.g., IP tunnel over a WWAN link) that act as a virtual OOB link.

Figure 4:
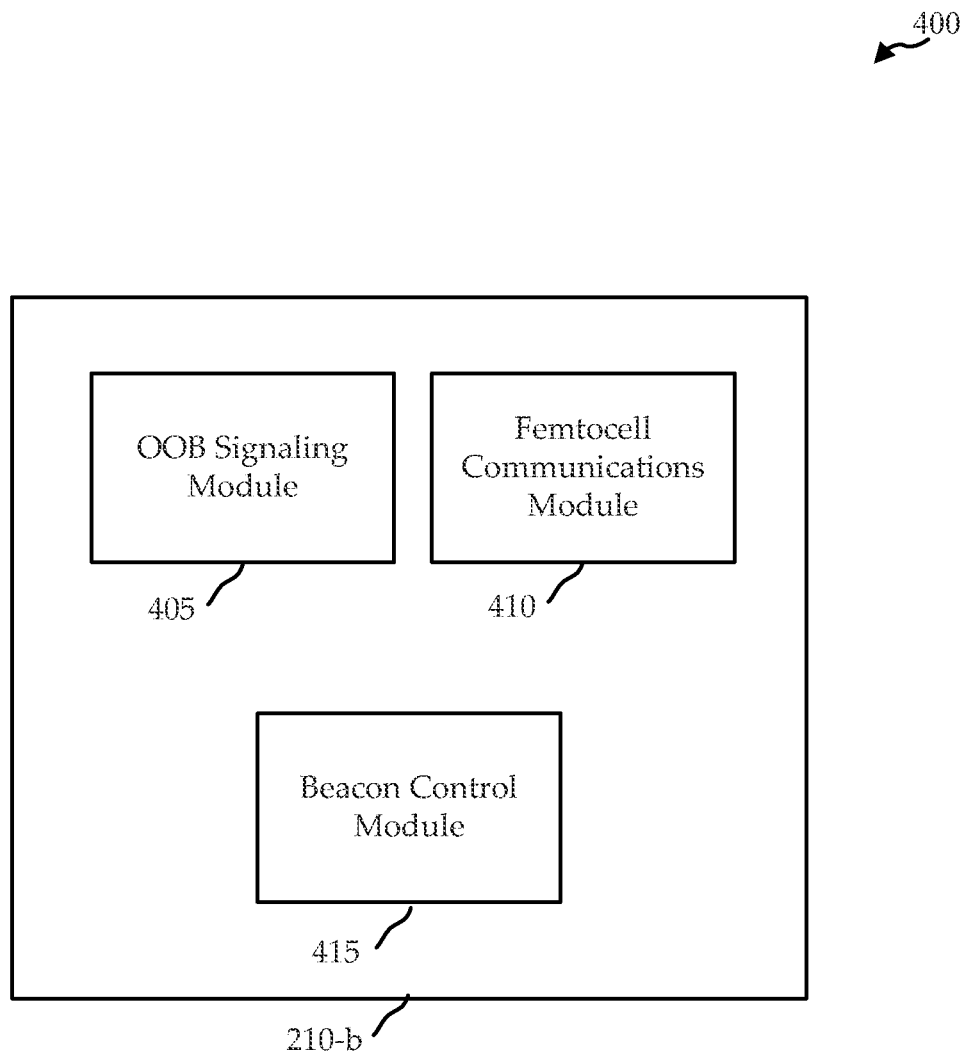
FIG. 4 is a block diagram illustrating an example of a processor module.

Referring next to FIG. 4, block diagram 400 illustrates a processor module 210-*b*. This processor module 210-*b* may be the controller 210 of FIG. 2 or 3. The processor module 210-*b* includes an OOB signaling module 405, femtocell communications module 410, and beacon control module 415. Each of these components may be in communication with each other, directly or indirectly.

The components of the processor module 210-*b* may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors. Each component may include memory, or accessed memory may be elsewhere on or off the processor module 210-*b*.

The OOB signaling module 405 may control transmission or reception of an OOB signal for one or more OOB signaling transceivers (e.g., OOB frequency transceiver 215 of FIG. 2 or 3). The OOB signaling module 405 may include the presence detection 325 and OOB signaling control 330 modules of FIG. 3. The beacon control module 415 may control the in-band beacon transceiver (e.g., macrocell frequency beacon transceiver 225 of FIG. 2 or 3) to transmit in-band beacon bursts (e.g., low or high power beacon bursts) in the macrocell frequency range. The beacon control module 415 may include one or more of the following: the low power beacon control 305, high power beacon control 310, beacon interval control 315, or beacon activation control 320 described with reference to FIG. 3. The femtocell communications module 410 may control communications signals transmitted in a femtocell frequency range (e.g., from femtocell frequency transceiver 220) to a mobile device after a mobile device has discovered and selected the femtocell.

A WWAN communications module (not shown) may be configured to control a WWAN communication from a core network to a mobile device (e.g., mobile device 115 of FIG. 1, 2, or 3), and determine how to handle the communication. The module may control communications functionality via many different types of networks and/or topologies. For example, the module may manage different interfaces for a femtocell, such as a wireless interface for a cellular telephone network, a cellular data network, a local area network (LAN), a metropolitan area network (MAN), a wide area network (WAN), the public switched telephone network (PSTN), the Internet, etc.

Figure 5:
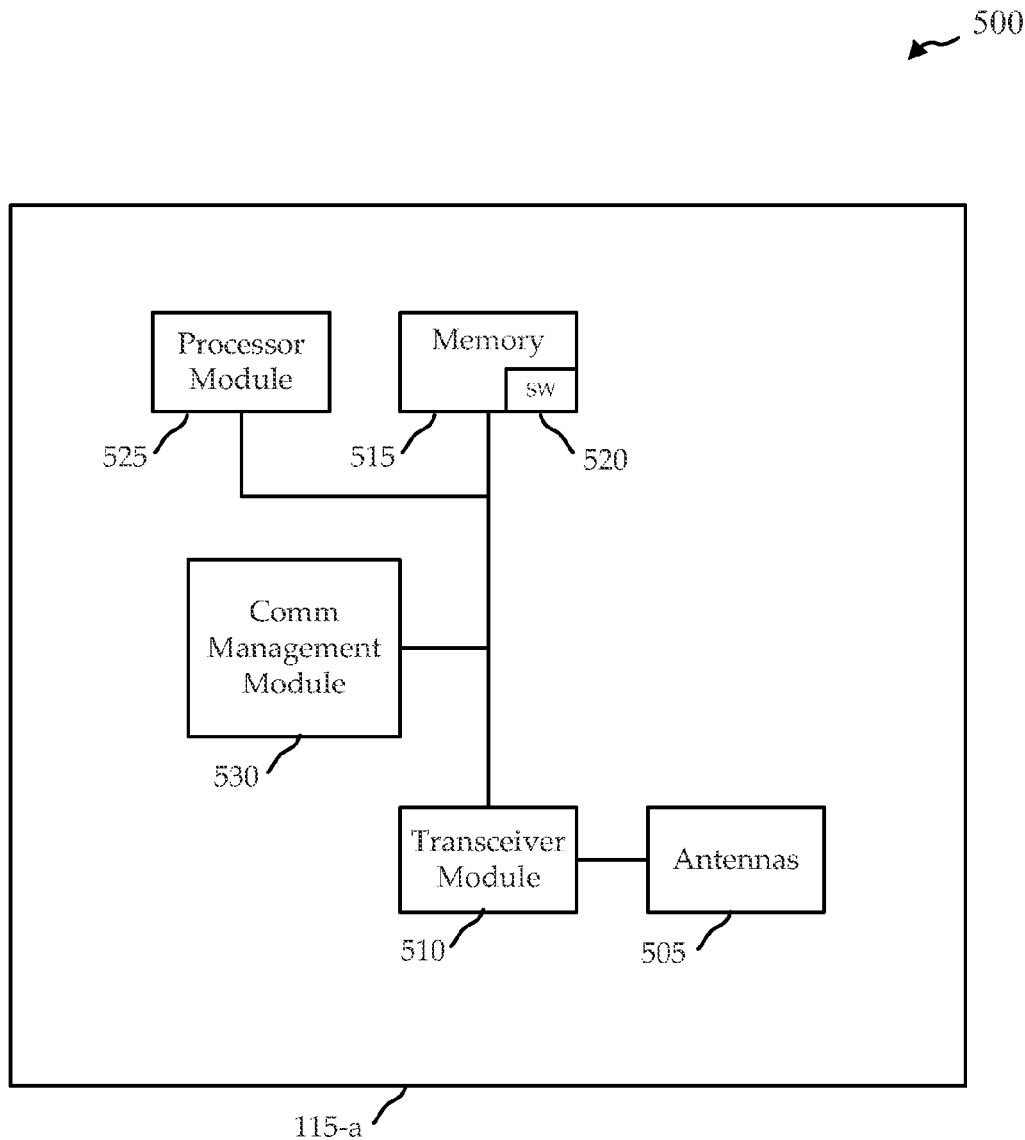
FIG. 5 is a block diagram illustrating a mobile device.

FIG. 5 is a block diagram 500 of a mobile device 115-*a*. This may be the mobile device 115-*a* of FIG. 1 or 2. The mobile device 115-*a* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-a may have an internal power supply (not shown), such as a small battery, to facilitate mobile operation.

The mobile device 115-a includes antennas 505, a transceiver module 510, memory 515, and a processor module 525, which each may be in communication, directly or indirectly, with each other (e.g., via one or more buses). The transceiver module 510 is configured to communicate bi-directionally, via the antennas 505 and/or one or more wired or wireless links, with one or more networks, as described above. For example, the transceiver module 510 may be configured to communicate bi-directionally with BTSs 105 of a macrocell of FIG. 1 or 2, and with the FAP 125 of FIG. 1, 2, or 3. The transceiver module 510 may include a modem configured to modulate the packets and provide the modulated packets to the antennas 505 for transmission, and to demodulate packets received from the antennas 505. While the mobile device 115-a may include a single antenna, the mobile device 115-a will typically include multiple antennas 505 for multiple links.

As generally referenced above, the transceiver module 510 may be configured to further communicate with a femtocell over one or more OOB links The mobile device 115-a may detect the presence of a femtocell by transmitting or receiving the OOB discovery messages. The mobile device 115-a may, in one example, identify the femtocell frequency range in response to detecting the presence of a femtocell, and select the femtocell. The mobile device 115-a may then receive communications signals in the femtocell frequency range from the femtocell. Thus, the mobile device 115-a may have the femtocell frequency range stored in memory, and access the information when the femtocell is detected. In another example, the mobile device 115-a may perform an inter-frequency scan for cell reselection in response to detecting the presence of the femtocell. The mobile device 115-a may identify the femtocell frequency range from the inter-frequency scan, and select the femtocell. The communications management module 530 may manage the femtocell discovery process.

The memory 515 may include random access memory (RAM) and read-only memory (ROM). The memory 515 may store computer-readable, computer-executable software code 520 containing instructions that are configured to, when executed, cause the processor module 525 to perform various functions described herein (e.g., call processing, database management, message routing, etc.). Alternatively, the software 520 may not be directly executable by the processor module 525 but be configured to cause the computer (e.g., when compiled and executed) to perform functions described herein.

The processor module 525 may include an intelligent hardware device, e.g., a central processing unit (CPU) such as those made by Intel® Corporation or AMD®, a microcontroller, an application specific integrated circuit (ASIC), etc. The processor module 525 may include a speech encoder (not shown) configured to receive audio via a microphone, convert the audio into packets (e.g., 30 ms in length) representative of the received audio, provide the audio packets to the transceiver module 510, and provide indications of whether a user is speaking Alternatively, an encoder may only provide packets to the transceiver module 510, with the provision or withholding/suppression of the packet itself providing the indication of whether a user is speaking According to the architecture of FIG. 5, the mobile device 115-a further includes a communications management module 530. The communications management module 530 may manage communications with a macrocell, femtocell (e.g., OOB links, in-band beacons, or femtocell frequencies), other mobile devices 115 (e.g., acting as a master of a secondary piconet), etc. By way of example, the communications management module 530 may be a component of the mobile device 115-a in communication with some or all of the other components of the mobile device 115-a via a bus. Alternatively, functionality of the communications management module 530 may be implemented as a component of the transceiver module 510, as a computer program product, and/or as one or more controller elements of the processor module 525.

The mobile device 115-a may include communications functionality for interfacing with a macrocell, femtocell, and one or more OOB networks. For example, some mobile devices 115-a include native cellular interfaces as part of the transceiver module 510 or the communications management module 530 (e.g., a transceiver utilizing cellular network communication techniques that consume relatively large amounts of power in operation) for communicating with other appropriately configured devices through a native cellular wireless link. The native cellular interfaces may operate according to one or more communication standards, including, but not limited to, W-CDMA, CDMA2000, GSM, WiMax, and WLAN.

Furthermore, the mobile device 115-a may also include OOB interfaces implemented as part of the transceiver module 510 and/or the communications management module 530 (e.g., a transceiver that may consume relatively low amounts of power in operation and/or may cause less interference than in the in-band spectrum) for communicating with other appropriately configured devices through a wireless link. One example of a suitable OOB communication interface is a Bluetooth-compliant transceiver that uses a time-division duplex (TDD) scheme.

Figure 6A:
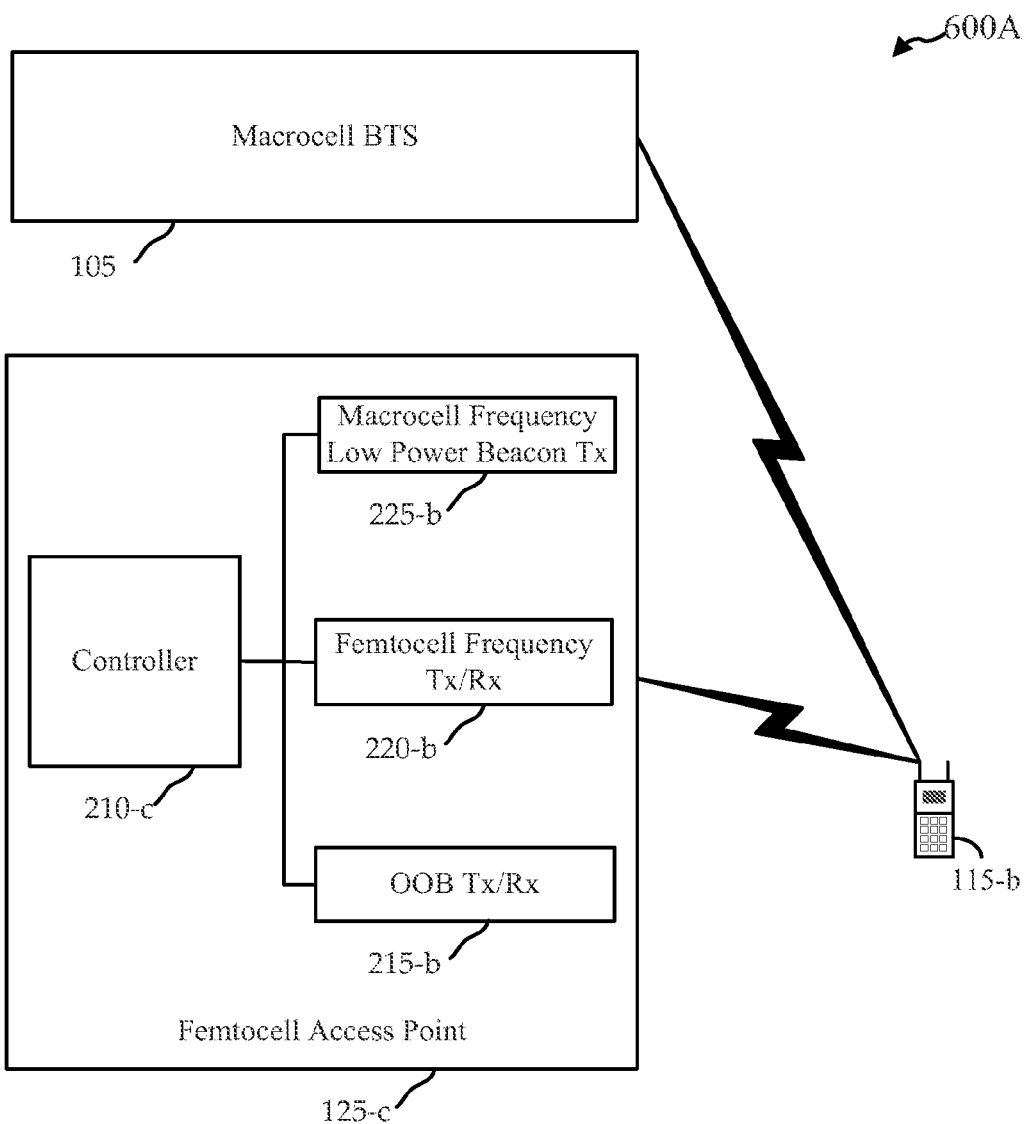
FIG. 6A is a block diagram illustrating a femtocell access point configured to facilitate femtocell discovery.

FIG. 6A is a block diagram of a wireless communications system 600A. The system may be an example of the system 100, 200 of FIG. 1 or 2. The system 600A includes a mobile device 115-b, a femtocell access point (FAP) 125-c, and a macrocell BTS 105. The FAP 125-c includes a controller 210-c, an OOB transceiver 215-b, a femtocell frequency transceiver 220-b, and a macrocell frequency low power beacon transmitter 225-b. Each of these components/devices may be in communication with each other, directly or indirectly.

Assume that the mobile device 115-b is camped on a macrocell, and approaches a femtocell. The OOB transceiver 215-b may be configured to transmit Bluetooth paging or inquiry messages to the mobile device 115-b, and be configured to receive Bluetooth paging or inquiry messages from the mobile device 115-b. Thus, the Bluetooth links may be used to detect the presence of the mobile device 115-b, or notify the mobile device 115-b that the FAP 125-c is in close proximity. The OOB transceiver 215-b may use other protocols and frequencies, as described above.

The macrocell frequency low power beacon transmitter 225-b may perform in-band low power beacon burst transmissions in the macrocell frequency range. These transmissions may be designed to trigger the mobile device 115-b to perform an inter-frequency scan for cell reselection. These transmissions may be time division multiplexed to hop across a number of different macrocell frequency ranges. These beacon bursts may have varying duty cycles (e.g., depending on whether mobile device presence has been detected via a Bluetooth message from a mobile device 115-*b*).

The mobile device 115-*b* may be configured with additional functionality for the novel FAP 125-*c* architecture. The mobile device 115-*b* may detect the presence of the FAP 125-*c* by transmitting or receiving the Bluetooth paging or inquiry messages. The mobile device 115 may, in one example, identify the femtocell frequency range in response to detecting the presence of the FAP 125-*c*, and select the FAP 125-*c*. The mobile device 115-*b* may then receive communications signals in the femtocell frequency range from the femtocell frequency transceiver 220-*b*. Thus, the mobile device 115-*b* may have the femtocell frequency range for the FAP 125-*c* stored in memory, and access the information when the FAP 125-*c* is detected.

In another example, the mobile device 115-*b* may perform an inter-frequency scan for cell reselection in response to detecting the presence of the FAP 125-*c*. The mobile device 115-*b* may identify the femtocell frequency range from the inter-frequency scan, and select the femtocell. The mobile device 115-*b* may then receive communications signals in the femtocell frequency range from the femtocell frequency transceiver 220-*b*.

Figure 6B:
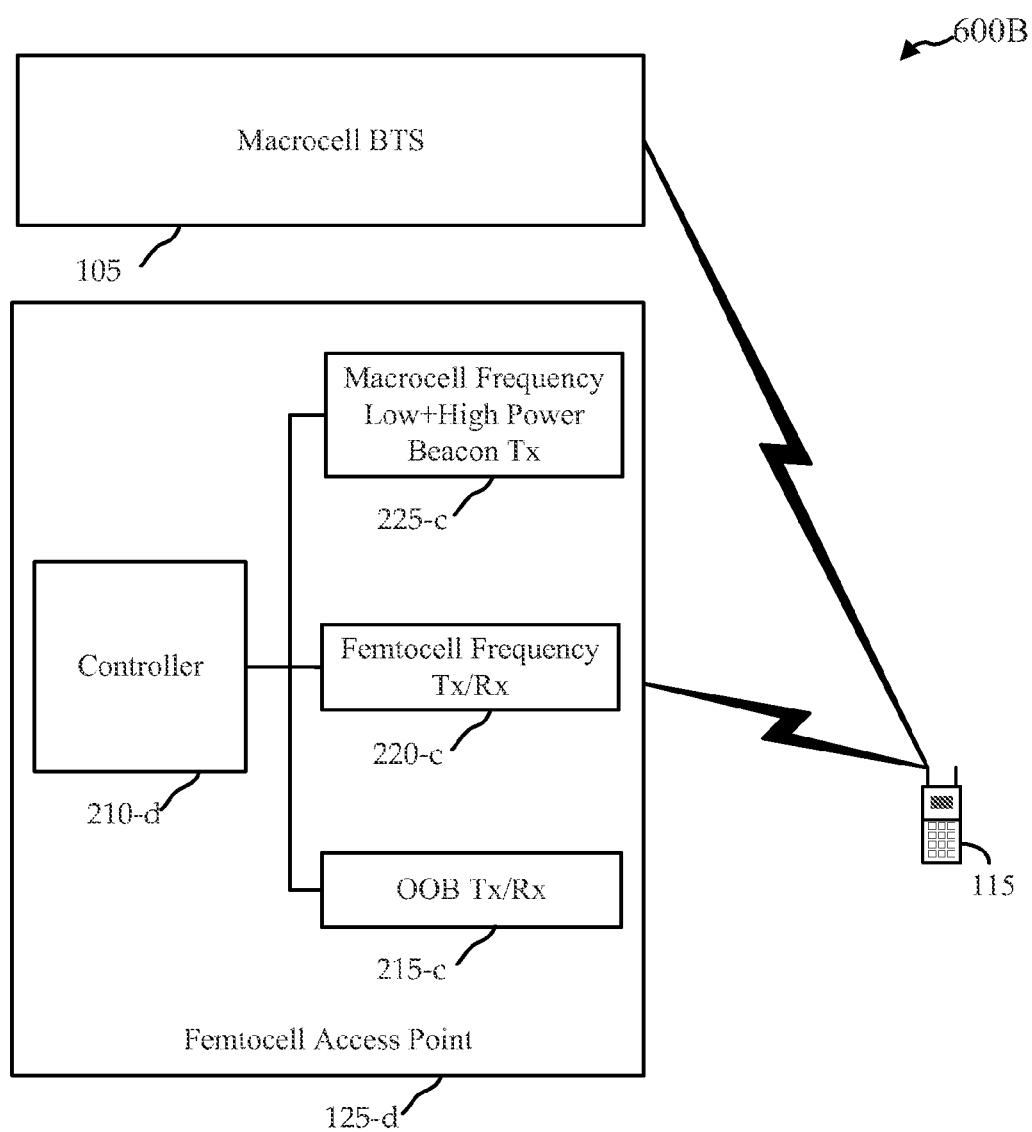
FIG. 6B is a block diagram illustrating an alternative femtocell access point configured to facilitate femtocell discovery.

FIG. 6B is a block diagram of a wireless communications system 600B. The system may be an example of the system 100, 200 of FIG. 1 or 2. The system 600B includes a mobile device 115, a femtocell access point (FAP) 125-*d*, and a macrocell BTS 105. The FAP 125-*d* includes a controller 210-*d*, an OOB transceiver 215-*c*, a femtocell frequency transceiver 220-*c*, and a macrocell frequency low+high power beacon transmitter 225-*c*. Each of these components/devices may be in communication with each other, directly or indirectly.

Again assume that the mobile device 115 is camped on a macrocell, and approaches a femtocell. The OOB transceiver 215-*c* may be configured to transmit Bluetooth paging or inquiry messages to the mobile device 115, and be configured to receive Bluetooth paging or inquiry messages from the mobile device 115. Thus, the Bluetooth links may be used to detect the presence of the mobile device 115, and notify the mobile device 115 that the FAP 125-*d* is in close proximity. The OOB transceiver 215-*b* may use other protocols and frequencies, as described above.

The macrocell frequency low+high power beacon transmitter 225-*c* may perform in-band low power beacon burst transmissions in the macrocell frequency range to the mobile device 115. These transmissions may be designed to trigger the mobile device 115 to perform an inter-frequency scan for cell reselection. These transmissions may be time division multiplexed to hop across a number of different macrocell frequency ranges. These beacon bursts may have varying duty cycles (e.g., depending on whether mobile device presence has been detected via a Bluetooth message from a mobile device 115).

The controller 210-*d* may monitor the Bluetooth transceiver 215-*c* to detect a mobile device presence (to detect the presence of a mobile device 115, Bluetooth inquiry or paging signals may be transmitted to, or received from, the mobile device 115). The controller 210-*d* may control high power in-band beacon bursts from the macrocell frequency low+high power beacon transmitter 225-*c* based on this monitoring. In one set of examples, the high power in-band beacon burst transmissions to the mobile device 115 may be suspended when no mobile device presence is detected (or when no registered mobile device presence is detected, for restricted access). Suspended high power in-band beacon burst transmissions to the mobile device 115 may be activated or reactivated when mobile device presence is detected (or when registered mobile device presence is detected, for restricted access). In another set of examples, the controller 210-*d* may control the interval of high power in-band beacon bursts based on this monitoring. For example, the controller 210-*d* may control the macrocell frequency low+high power beacon transmitter 225-*c* to transmit high power, in-band beacon burst transmissions at a longer interval when no mobile devices are detected (or when no registered mobile device presence is detected, for restricted access). Once a mobile device 115 is detected (or when registered mobile device presence is detected, for restricted access), the controller 210-*d* may control the macrocell frequency low+high power beacon transmitter 225-*c* to transmit high power, in-band beacon burst transmissions at a shorter interval. Thus, the spacing between high power beacon transmissions may be shortened when a mobile device 115 is detected, and expanded if not.

Figure 7A:
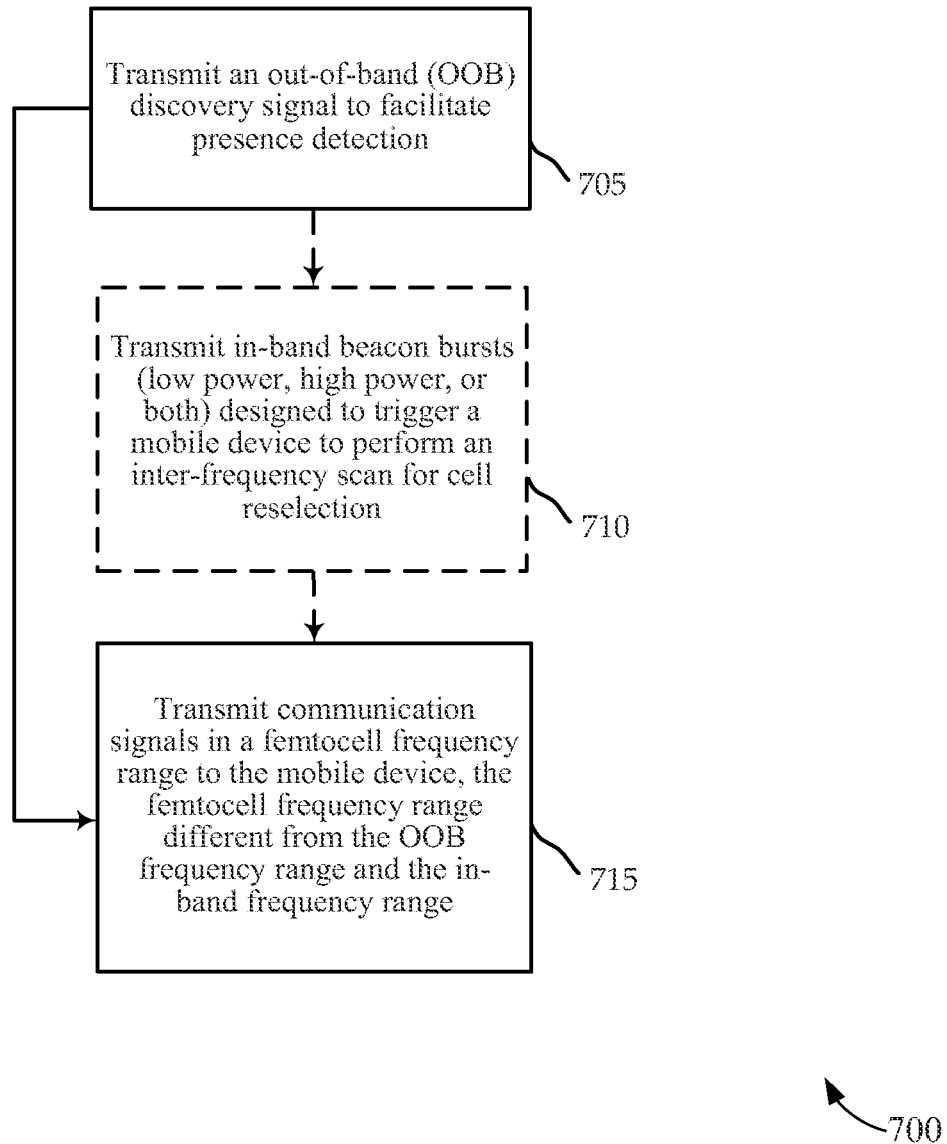
FIG. 7A is a flowchart of a method for mitigating interference during femtocell discovery.

FIG. 7A is a flowchart 700A of a method for mitigating interference during femtocell discovery in a wireless communications system according to various embodiments of the invention. The method 700A may be performed, for example, in whole or in part, by the femtocell 125 of FIG. 1, 2, 3, 6A, or 6B, or the controller 210 of FIG. 2, 3, 4, 6A, or 6B, or any combination thereof At block 705, an OOB discovery signal is transmitted to facilitate presence detection. At block 710, in-band beacon bursts (low power, high power, or both) are transmitted to the mobile device, the in-band beacon bursts generated to trigger the mobile device to perform an inter-frequency scan for cell reselection. Via the OOB discovery signal or in-band beacon, the mobile device acquires the femtocell and camps (idle state) or performs handoff (active state) to it. At block 715, communication signals in a femtocell frequency range are transmitted to the mobile device, the femtocell frequency range different from the OOB frequency range and the in-band frequency range. It is worth noting that in some examples, the flow may be from block 705 to block 715, and the use of an in-beacon burst may be skipped.

Figure 7B:
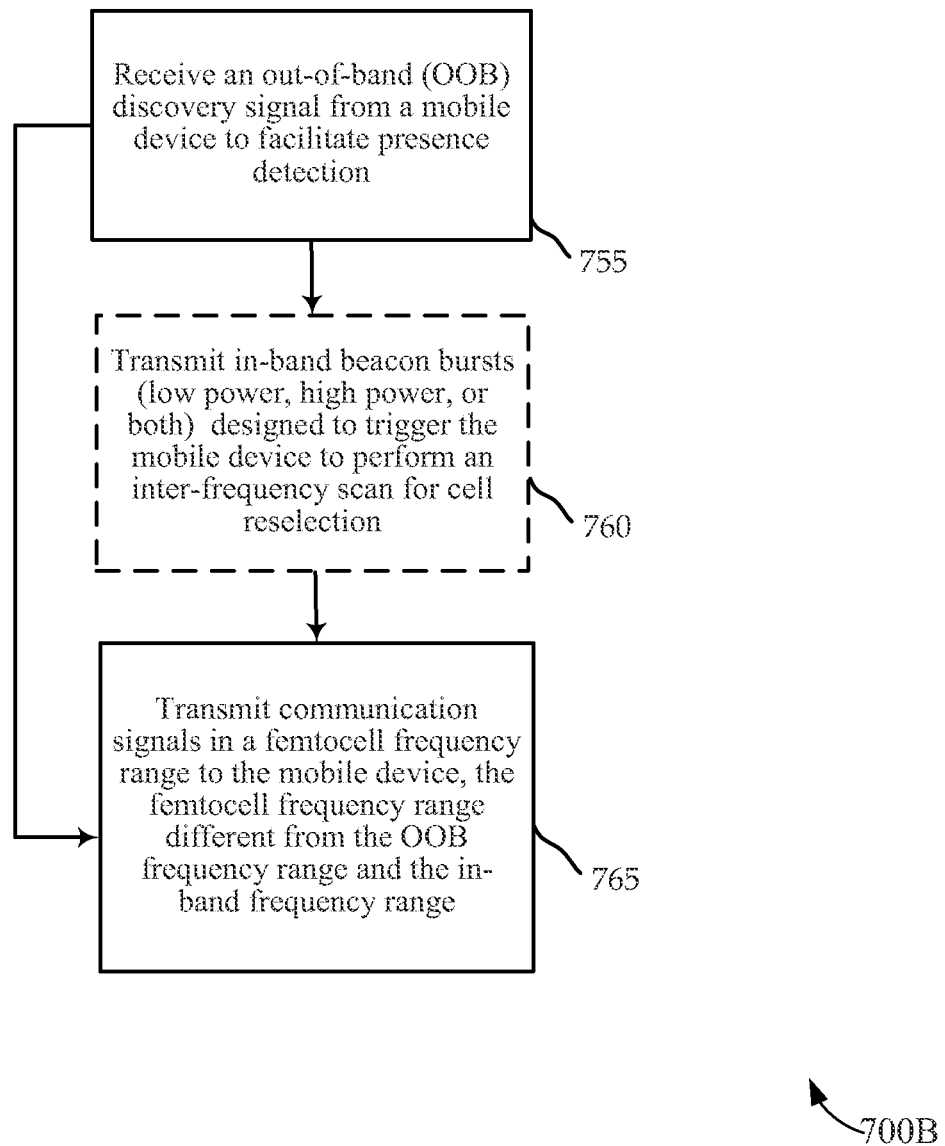
FIG. 7B is a flowchart of an alternative method for mitigating interference during femtocell discovery.

FIG. 7B is a flowchart 700B of an alternative method for mitigating interference during femtocell discovery in a wireless communications system according to various embodiments of the invention. The method 700B may be performed, for example, in whole or in part, by the femtocell 125 of FIG. 1, 2, 3, 6A, or 6B, or the controller 210 of FIG. 2, 3, 4, 6A, or 6B, or any combination thereof.

At block 755, an OOB discovery signal is received from the mobile device. At block 810, in-band beacon bursts are transmitted to a mobile device, the in-band bursts generated to trigger the mobile device to perform an inter-frequency scan for cell reselection. Via the OOB discovery signal or in-band beacon, the mobile device acquires the femtocell and camps (idle state) or performs handoff (active state) to it. At block 815, communication signals in a femtocell frequency range are transmitted to the mobile device, the femtocell frequency range different from the OOB frequency range and the in-band frequency range. It is worth noting that in some examples, the flow may be from block 755 to block 765, and the use of an in-beacon burst may be skipped.

Figure 8A:
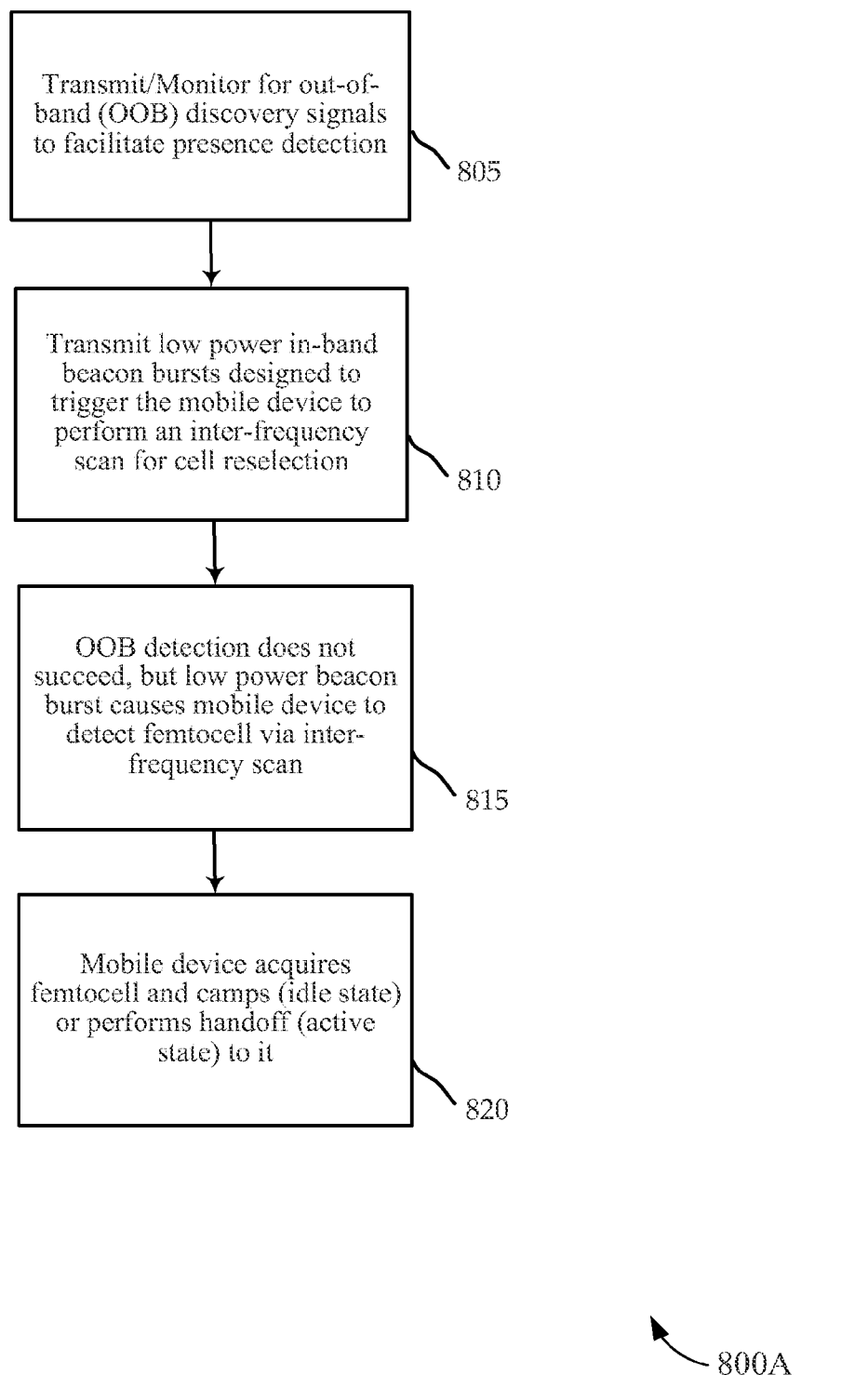
FIG. 8A is a flowchart of a method for mitigating interference during femtocell discovery.

FIG. 8A is a flowchart 800A of a method for mitigating interference during femtocell discovery in a wireless communications system according to various embodiments of the invention. The method 800A may be performed, for example, in whole or in part, by the femtocell 125 of FIG. 1, 2, 3, 6A, or 6B, or the controller 210 of FIG. 2, 3, 4, 6A, or 6B, or any combination thereof.

At block 805, OOB discovery signals are transmitted or monitored for to facilitate presence detection. At block 810, low power in-band beacon bursts are transmitted, designed to trigger the mobile device to perform an inter-frequency scan for cell reselection. At block 815, OOB detection does not succeed, but a low power beacon burst causes mobile device to detect femtocell via an inter-frequency scan. Thus, if OOB detection does not succeed, then the low power beacon burst may ensure that the mobile device still detects the femtocell. At block 820, a mobile device acquires femtocell and camps (idle state) or performs handoff (active state) to it.

Figure 8B:
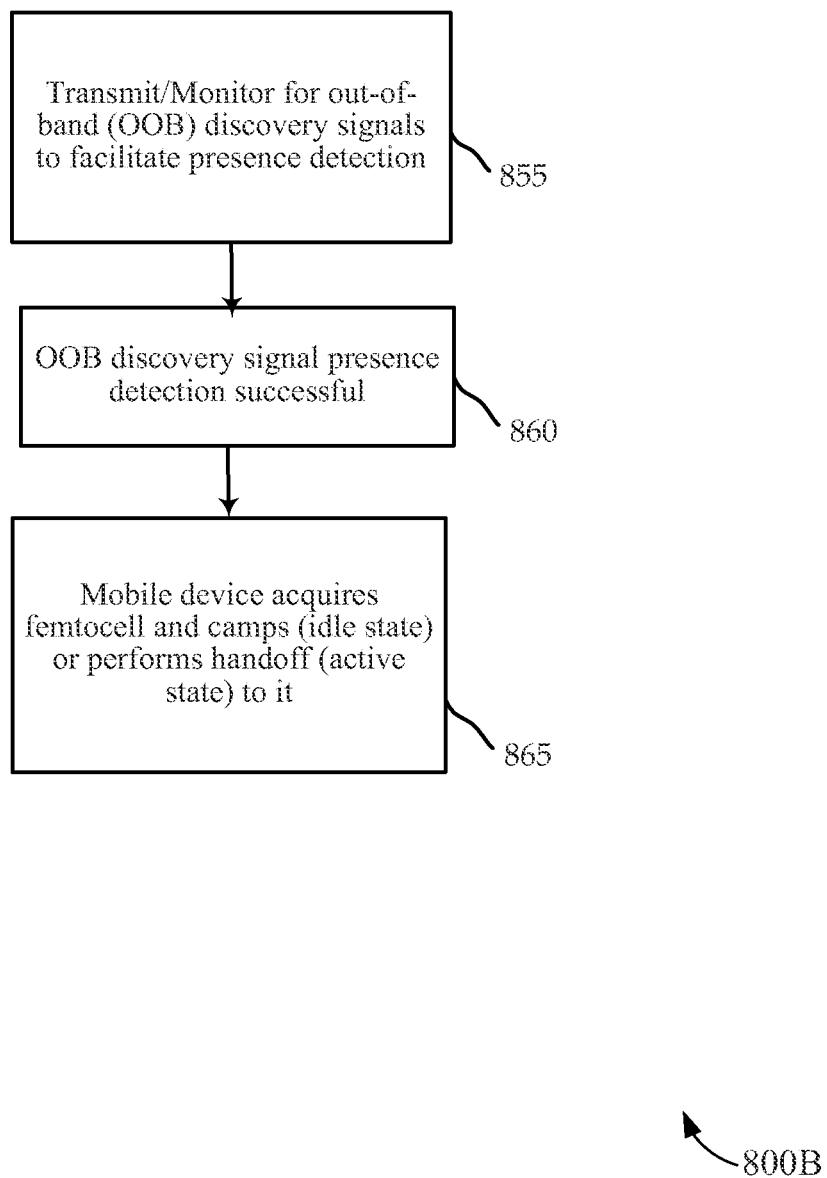
FIG. 8B is a flowchart of a method for mitigating interference during femtocell discovery.

FIG. 8B is a flowchart 800B of a method for mitigating interference during femtocell discovery in a wireless communications system according to various embodiments of the invention. The method 800B may be performed, for example, in whole or in part, by the femtocell 125 of FIG. 1, 2, 3, 6A, or 6B, or the controller 210 of FIG. 2, 3, 4, 6A, or 6B, or any combination thereof At block 855, OOB discovery signals are transmitted or monitored for to facilitate presence detection. At block 860, OOB signal presence detection is successful. At block 815, a mobile device acquires femtocell and camps (idle state) or performs handoff (active state) to it.

Figure 9:
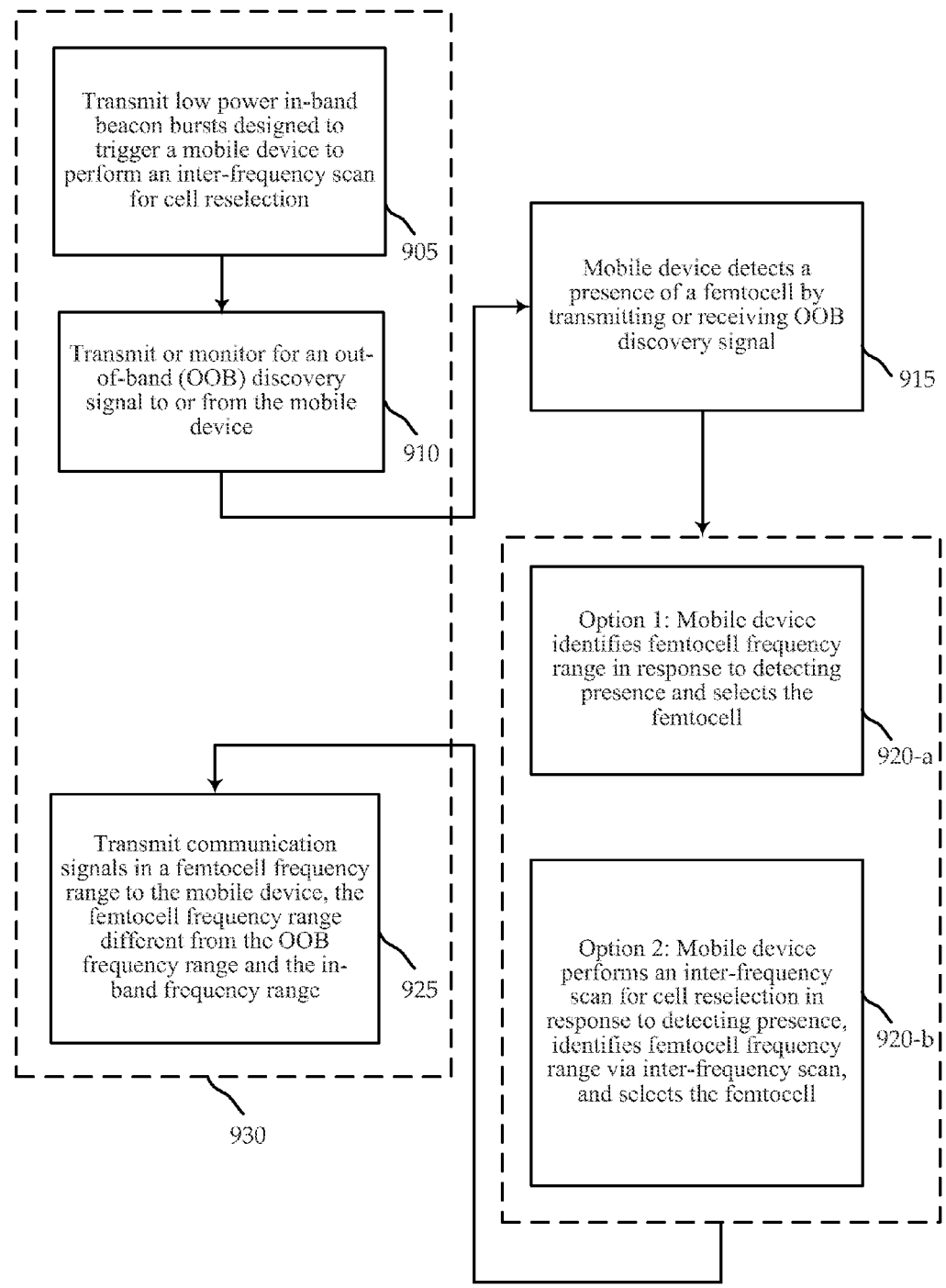
FIG. 9 is a flowchart of a method for femtocell discovery with enhanced mobile device functionality.

FIG. 9 is a flowchart 900 of another method for mitigating interference during femtocell discovery in a wireless communications system according to various embodiments of the invention. This method 900 may be an example of the method 700A, 700B, 800A, or 800B described with reference to FIG. 7A, 7B, 8A, or 8B. The method 900 may be performed, for example, by the system 100, 200 of FIG. 1 or 2. It may be performed by the mobile device 115 of FIG. 1, 2, 5, 6A, or 6B with the femtocell 125 of FIG. 1, 2, 3, 6A, or 6B, or the controller 210 of FIG. 2, 3, 4, 6A, or 6B.

At block 905, low power in-band beacon bursts are transmitted to a mobile device, the in-band bursts generated to trigger a mobile device to perform an inter-frequency scan for cell reselection (these low power in-band beacon bursts are not present in some examples—thus high and optionally low power beacons may be eliminated to reduce femtocell beacon interference in macro frequencies). At block 910, an OOB discovery signal is transmitted or received to or from the mobile device. At block 915, the mobile device detects the presence of a femtocell by transmitting or receiving the OOB discovery signal.

There are different options, depending on the configuration of a mobile device. In option 1, at block 920-a, the mobile device identifies the femtocell frequency range in response to detecting presence, and selects the femtocell. In option 2, at block 920-b, the mobile device performs an inter-frequency scan for cell reselection in response to detecting the presence, identifies the femtocell frequency range via the inter-frequency scan, and selects the femtocell. A number of other options are available, and described in detail above.

At block 925, communication signals are transmitted in a femtocell frequency range to the mobile device, the femtocell frequency range different from the OOB frequency range and the in-band frequency range. The steps undertaken by the blocks within block 930 (i.e., block 905, 910, and 925) may be undertaken by the femtocell.

Figure 10:
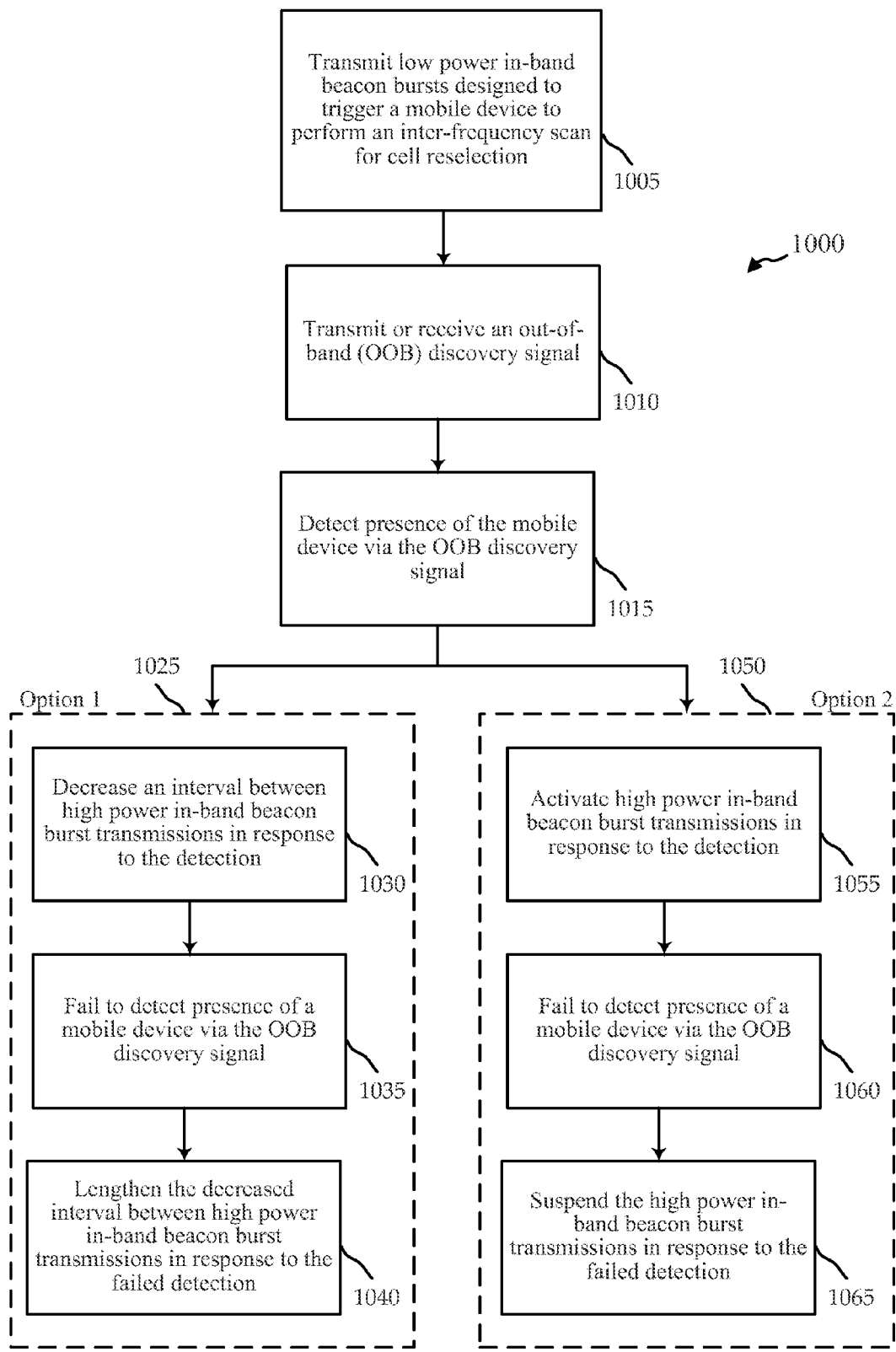
FIG. 10 is a flowchart of a method dynamically limiting beacon interference during femtocell discovery.

FIG. 10 is a flowchart 1000 of yet another method for mitigating interference during femtocell discovery in a wireless communications system according to various embodiments of the invention. This method 1000 may be an example of the method 700A, 700B, 800A, or 800B described with reference to FIG. 7A, 7B, 8A, or 8B. The method 1000 may be performed, for example, by the system 100, 200 of FIG. 1 or 2. It may be performed by the mobile device 115 of FIG. 1, 2, 5, 6A, or 6B, with the femtocell 125 of FIG. 1, 2, 3, 6A, or 6B, or the controller 210 of FIG. 2, 3, 4, 6A, or 6B.

At block 1005, low power in-band beacon bursts are transmitted, the low power in-band bursts generated to trigger a mobile device to perform an inter-frequency scan for cell reselection. At block 1010, an OOB discovery signal is transmitted or received. At block 1015, the presence of the mobile device is detected via the OOB discovery signal.

There are different options that may be used depending on system configuration. Block 1025 contains option 1. At block 1030, an interval between high power in-band beacon burst transmissions is decreased in response to the mobile device detection. At block 1035, the OOB discovery signal fails to detect the presence of a mobile device. At block 1040, the decreased interval between high power in-band beacon burst transmissions is lengthened in response to the failed detection.

Block 1050 contains option 2. At block 1055, high power in-band beacon burst transmissions are activated in response to the detection. At block 1060, the OOB discovery signal fails to detect the presence of a mobile device. At block 1065, the high power in-band beacon burst transmissions are suspended in response to the failed detection. A number of other options are available, and described in detail above.

Figure 11:
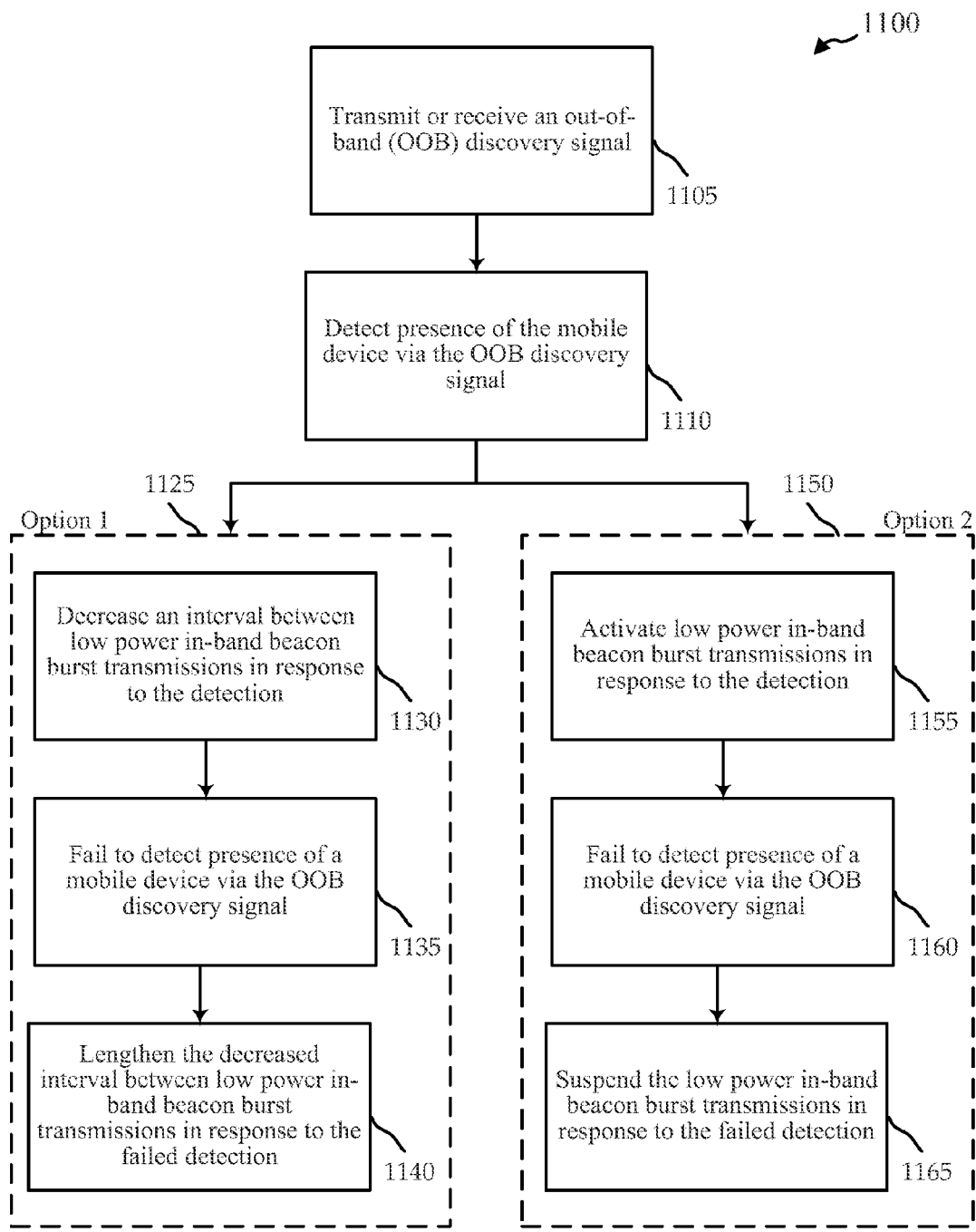
FIG. 11 is a flowchart of a method for mitigating interference during femtocell discovery.

FIG. 11 is a flowchart 1100 of yet another method for mitigating interference during femtocell discovery in a wireless communications system according to various embodiments of the invention. This method 1100 may be an example of the method 700A, 700B, 800A, or 800B described with reference to FIG. 7A, 7B, 8A, or 8B. The method 1100 may be performed, for example, by the system 100, 200 of FIG. 1 or 2. It may be performed by the mobile device 115 of FIG. 1, 2, 5, 6A, or 6B, with the femtocell 125 of FIG. 1, 2, 3, 6A, or 6B, or the controller 210 of FIG. 2, 3, 4, 6A, or 6B.

At block 1105, an OOB discovery signal is transmitted or received. At block 1110, the presence of the mobile device is detected via the OOB discovery signal.

There are different options that may be used depending on system configuration. Block 1125 contains option 1, and assumes that the low power in band beacon is active. At block 1130, an interval between low power in-band beacon burst transmissions is decreased in response to the mobile device detection. At block 1135, the OOB discovery signal fails to detect the presence of a mobile device. At block 1140, the decreased interval between low power in-band beacon burst transmissions is lengthened in response to the failed detection.

Block 1150 contains option 2. At block 1155, low power in-band beacon burst transmissions are activated in response to the detection. At block 1160, the OOB discovery signal fails to detect the presence of a mobile device. At block 1165, the low power in-band beacon burst transmissions are suspended in response to the failed detection. A number of other options are available, and described in detail above.

Considerations Regarding the Description

The detailed description set forth above in connection with the appended drawings describes exemplary embodiments and does not represent the only embodiments that may be implemented or that are within the scope of the claims. The term "exemplary" used in this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A system for femtocell discovery, the system comprising:
   a mobile device camped in a first frequency range on a macrocell; and
   a femtocell access point including:
      a first transceiver configured to transmit to, or receive from, the mobile device an out-of-band (OOB) discovery signal in a second frequency range, the second frequency range different from the first frequency range;
      a second transmitter configured to perform transmissions in a third frequency range to the mobile device, the third frequency range different from the first frequency range and the second frequency range; and
      a third transmitter configured to perform in-band beacon burst transmissions in the first frequency range to the mobile device to trigger the mobile device to perform an inter-frequency scan for cell reselection, wherein the in-band beacon burst transmissions are transmitted at two or more different intervals, and the in-band beacon burst transmissions are transmitted at a first interval, shorter than at least one of the two or more different intervals, when the mobile device is detected via the first transceiver.

2. The system of claim 1, wherein to perform in-band beacon burst transmissions in the first frequency range, the third transmitter is configured to:
   perform low power, in-band beacon burst transmissions in the first frequency range.

3. The system of claim 1, wherein to perform in-band beacon burst transmissions in the first frequency range, the third transmitter is configured to:
   perform high power, in-band beacon burst transmissions in the first frequency range.

4. The system of claim 1, wherein in-band beacon burst transmissions in the first frequency range comprise time-division multiplexed signals.

5. The system of claim 4, wherein the in-band beacon burst transmissions comprise a time-division multiplexed beacon which hops from the first frequency range to other macrocell frequency ranges.

6. The system of claim 1, wherein the in-band beacon burst transmissions are transmitted at a second interval, longer than at least one of the two or more different intervals, when the presence of one or more mobile devices already camped on the third frequency is detected.

7. The system of claim 1, further comprising:
   the mobile device configured to:
   detect a presence of the femtocell access point by transmitting to or receiving from the femtocell access point the OOB discovery signal in the second frequency range;

identify the third frequency range in response to detecting the presence of the femtocell access point; and
select the femtocell.

8. The system of claim 1, further comprising:
the mobile device configured to:
    detect a presence of the femtocell access point by transmitting to or receiving from the femtocell access point the OOB discovery signal in the second frequency range;
    perform an inter-frequency scan for cell reselection in response to detecting the presence of the femtocell access point;
    identify the third frequency range from the inter-frequency scan; and
    select the femtocell.

9. The system of claim 8, wherein to perform in-band beacon burst transmissions in the first frequency range, the third transmitter is configured to:
    perform low power, in-band beacon burst transmissions in the first frequency range.

10. The system of claim 9, wherein the mobile device is configured to perform the inter-frequency scan for cell reselection in response to detecting the presence of the femtocell access point without waiting for the low power, in-band beacon burst transmissions.

11. The system of claim 1, wherein,
the OOB discovery signals transmitted from the first transceiver to the mobile device comprise a Bluetooth page sequence.

12. The system of claim 1, wherein,
the OOB discovery signals transmitted from the first transceiver to the mobile device comprise a Bluetooth inquiry sequence.

13. The system of claim 1, wherein,
the OOB discovery signals transmitted to the first transceiver from the mobile device comprise a Bluetooth page sequence.

14. The system of claim 1, wherein,
the OOB discovery signals transmitted to the first transceiver from the mobile device comprise a Bluetooth inquiry sequence.

15. The system of claim 1, further comprising:
a plurality of additional macrocell transmitters configured to perform in-band transmissions in a plurality of additional frequency ranges, wherein,
the third transmitter is configured to perform in-band beacon burst transmissions in the plurality of additional frequency ranges to trigger mobile devices to perform an inter-frequency scan for cell reselection.

16. The system of claim 15, wherein the in-band beacon burst transmissions comprise time-division multiplexed beacons which hop from the first frequency range to each of the plurality of additional frequency ranges in a round robin pattern.

17. The system of claim 1, wherein the mobile device camped in the first frequency range is in an active or idle state.

18. A femtocell access point configured to facilitate femtocell discovery for a mobile device camped in a first frequency range on a macrocell, the femtocell access point comprising:
    a first transceiver configured to transmit to, or receive from, the mobile device an out-of-band (OOB) discovery signal in a second frequency range, the second frequency range different from the first frequency range;
    a second transmitter configured to perform transmissions in a third frequency range to the mobile device, the third frequency range different from the first frequency range and the second frequency range; and
    a third transmitter configured to perform in-band beacon burst transmissions in the first frequency range to the mobile device to trigger the mobile device to perform an inter-frequency scan for cell reselection, wherein the in-band beacon burst transmissions are transmitted at two or more different intervals, and the in-band beacon burst transmissions are transmitted at a first interval, shorter than at least one of the two or more different intervals, when the mobile device is detected via the first transceiver.

19. The femtocell access point of claim 18, wherein to perform in-band beacon burst transmissions in the first frequency range, the third transmitter is configured to:
    perform low power, in-band beacon burst transmissions in the first frequency range.

20. The femtocell access point of claim 18, wherein to perform in-band beacon burst transmissions in the first frequency range, the third transmitter is configured to:
    perform high power, in-band beacon burst transmissions in the first frequency range.

21. The femtocell access point of claim 18, wherein in-band beacon burst transmissions in the first frequency range comprise time-division multiplexed signals.

22. The femtocell access point of claim 21, wherein the in-band beacon burst transmissions comprise a time-division multiplexed beacon which hops from the first frequency range to other macrocell frequency ranges.

23. The femtocell access point of claim 18, wherein the in-band beacon burst transmissions are transmitted at a second interval, longer than at least one of the two or more different intervals, when the presence of one or more mobile devices already camped on the third frequency is detected.

24. The femtocell access point of claim 18, wherein,
the OOB discovery signals transmitted from the first transceiver to the mobile device comprise a Bluetooth page sequence.

25. The femtocell access point of claim 18, wherein,
the OOB discovery signals transmitted from the first transceiver to the mobile device comprise a Bluetooth inquiry sequence.

26. The femtocell access point of claim 18, wherein,
the OOB discovery signals transmitted to the first transceiver from the mobile device comprise a Bluetooth page sequence.

27. The femtocell access point of claim 18, wherein,
the OOB discovery signals transmitted to the first transceiver from the mobile device comprise a Bluetooth inquiry sequence.

28. The femtocell access point of claim 18, further comprising:
    a plurality of additional macrocell transmitters configured to perform in-band transmissions in a plurality of additional frequency ranges, wherein,
    the third transmitter is configured to perform in-band beacon burst transmissions in the plurality of additional frequency to trigger mobile devices to perform an inter-frequency scan for cell reselection.

29. The femtocell access point of claim 28, wherein the in-band beacon burst transmissions comprise time-division multiplexed beacons which hop from the first frequency range to each of the plurality of additional frequency ranges in a round robin pattern.

30. The femtocell access point of claim 18, wherein the mobile device camped in the first frequency range is in an active or idle state.

31. A mobile device camped in a first frequency range on a macrocell, the mobile device comprising:
- at least one processor; and
- a memory communicatively coupled with the at least one processor, wherein the at least one processor is configured to execute code stored on the memory to:
  - detect a presence of a femtocell access point by transmitting to or receiving from a first transceiver at the femtocell access point an out-of-band (OOB) discovery signal in a second frequency range, the second frequency range different from the first frequency range;
  - identify a third frequency range in response to detecting the presence of the femtocell access point, the third frequency range for communications with a second transceiver at the femtocell access point, the third frequency range different from the first frequency range and the second frequency range; and
  - select the femtocell, wherein the femtocell access point further includes a third transmitter configured to perform in-band beacon burst transmissions in the first frequency range, wherein the in-band beacon burst transmissions are performed to trigger an inter-frequency scan for cell reselection, and are transmitted at two or more different intervals, and the in-band beacon burst transmissions are transmitted at a first interval, shorter than at least one of the two or more different intervals, when the mobile device is detected via the first transceiver.

32. A mobile device camped in a first frequency range on a macrocell, the mobile device comprising:
- at least one processor; and
- a memory communicatively coupled with the at least one processor, wherein the at least one processor is configured to execute code stored on the memory to:
  - transmit to or receive from a first transceiver at a femtocell access point an out-of-band (OOB) discovery signal in a second frequency range, the second frequency range different from the first frequency range;
  - perform an inter-frequency scan for cell reselection;
  - identify a third frequency range from the inter-frequency scan, the third frequency range for communications with a second transceiver at the femtocell access point, the third frequency range different from the first frequency range and the second frequency range; and
  - select the femtocell, wherein the femtocell access point further includes a third transmitter configured to perform in-band beacon burst transmissions in the first frequency range, wherein the in-band beacon burst transmissions are performed to trigger the inter-frequency scan for cell reselection, and are transmitted at two or more different intervals, and the in-band beacon burst transmissions are transmitted at a first interval, shorter than at least one of the two or more different intervals, when the mobile device is detected via the first transceiver.

33. The mobile device of claim 32, wherein the at least one processor is further configured to execute code stored on the memory to perform the inter-frequency scan for cell reselection in response to detecting the presence of the femtocell access point without waiting for low power, in-band beacon burst transmissions.

34. A computer program product for facilitating femtocell discovery for a mobile device camped in a first frequency range on a macrocell, the computer program product comprising:
- a non-transitory computer-readable medium comprising:
  - executable code for causing a first transceiver to transmit to, or receive from, a mobile device an out-of-band (OOB) discovery signal in a second frequency range, the second frequency range different from the first frequency range;
  - executable code for causing a second transmitter configured to perform transmissions in a third frequency range to the mobile device, the third frequency range different from the first frequency range and the second frequency range; and
  - executable code for causing a third transmitter configured to perform in-band beacon burst transmissions, OOB discovery signal, in the first frequency range to the mobile device to trigger the mobile device to perform an inter-frequency scan for cell reselection, wherein the in-band beacon burst transmissions are transmitted at two or more different intervals, and the in-band beacon burst transmissions are transmitted at a first interval, shorter than at least one of the two or more different intervals, when the mobile device is detected via the first transceiver.

35. An apparatus for facilitating femtocell discovery by a mobile device camped in a first frequency range on a macrocell, the apparatus comprising:
- means for transmitting to, or receiving from, a mobile device an out-of-band (OOB) discovery signal in a second frequency range, the second frequency range different from the first frequency range;
- means for transmitting communication signals in a third frequency range to the mobile device, the third frequency range different from the first frequency range and the second frequency range; and
- means for transmitting in-band beacon burst transmissions in the first frequency range to the mobile device to trigger the mobile device to perform an inter-frequency scan for cell reselection, wherein the in-band beacon burst transmissions are transmitted at two or more different intervals, and the in-band beacon burst transmissions are transmitted at a first interval, shorter than at least one of the two or more different intervals, when the mobile device is detected via the OOB discovery signal.

36. A method for facilitating femtocell discovery by a mobile device camped in a first frequency range on a macrocell, the method comprising:
- transmitting to, or receiving from, a mobile device an out-of-band (OOB) discovery signal in a second frequency range, the second frequency range different from the first frequency range;
- transmitting communication signals in a third frequency range to the mobile device, the third frequency range different from the first frequency range and the second frequency range; and
- transmitting in-band beacon bursts in the first frequency range to the mobile device to trigger the mobile device to perform an inter-frequency scan for cell reselection, wherein the in-band beacon bursts are transmitted at two or more different intervals, and the in-band beacon bursts are transmitted at a first interval, shorter than at least one of the two or more different intervals, when the mobile device is detected via the OOB discovery signal.

37. The method of claim 36, wherein transmitting in-band beacon bursts comprises:
- transmitting low power, in-band beacon bursts in the first frequency range.

38. The method of claim 36, wherein transmitting in-band beacon bursts comprises:

transmitting high power, in-band beacon bursts in the first frequency range.

39. The method of claim 36, wherein in-band beacon burst transmissions in the first frequency range comprise time-division multiplexed signals.

40. The method of claim 39, wherein the in-band beacon burst transmissions comprise a time-division multiplexed beacon which hops from the first frequency range to other macrocell frequency ranges.

41. The method of claim 36, wherein the in-band beacon burst transmissions are transmitted at a second interval, longer than at least one of the two or more different intervals, when the presence of one or more mobile devices already camped on the third frequency is detected.

42. The method of claim 36, wherein,
the OOB discovery signals transmitted to the mobile device comprise a Bluetooth page sequence;
the OOB discovery signals transmitted to the mobile device comprise a Bluetooth inquiry sequence;
the OOB discovery signals received from the mobile device comprise a Bluetooth page sequence; or
the OOB discovery signals received from the mobile device comprise a Bluetooth inquiry sequence.

43. The method of claim 36, further comprising:
a plurality of additional macrocell transmitters configured to perform in-band transmissions in a plurality of additional frequency ranges, wherein in-band beacon burst transmissions are performed in the plurality of additional frequency ranges to trigger mobile devices to perform an inter-frequency scan for cell reselection.

44. The method of claim 43, wherein the in-band beacon burst transmissions comprise time-division multiplexed beacons which hop from the first frequency range to each of the plurality of additional frequency ranges in a round robin pattern.

45. The method of claim 36, wherein the receiving from the mobile device the out-of-band (OOB) discovery signal in the second frequency range comprises:
receiving data via a wired communication link indicating presence of the mobile device.

\* \* \* \* \*